United States Patent
Baba et al.

(10) Patent No.: US 8,832,279 B2
(45) Date of Patent: Sep. 9, 2014

(54) NETWORK SYSTEM, MACHINE ALLOCATION DEVICE AND MACHINE ALLOCATION METHOD

(75) Inventors: Takashige Baba, Inagi (JP); Akihiko Takase, Tokyo (JP); Kazuma Yumoto, Fuchu (JP); Tatsuhiko Miyata, Kawasaki (JP)

(73) Assignee: Hitachi, Ltd., Tokyo (JP)

( * ) Notice: Subject to any disclaimer, the term of this patent is extended or adjusted under 35 U.S.C. 154(b) by 231 days.

(21) Appl. No.: 13/369,553

(22) Filed: Feb. 9, 2012

(65) Prior Publication Data

US 2012/0254353 A1 Oct. 4, 2012

(30) Foreign Application Priority Data

Mar. 31, 2011 (JP) ................. 2011-078835

(51) Int. Cl.
*H04L 15/16* (2006.01)
*H04Q 3/00* (2006.01)
*H04L 12/46* (2006.01)
*H04Q 1/00* (2006.01)
*H04Q 11/00* (2006.01)
*H04L 12/54* (2013.01)

(52) U.S. Cl.
CPC ............... *H04Q 3/0008* (2013.01); *H04Q 1/00* (2013.01); *H04Q 11/00* (2013.01); *H04Q 2213/13531* (2013.01); *Y10S 379/901* (2013.01); *H04L 12/4641* (2013.01); *H04L 12/5692* (2013.01)
USPC ........... 709/227; 709/203; 709/218; 709/219; 709/220; 709/223; 709/232; 709/238; 709/248; 709/249; 379/901

(58) Field of Classification Search
CPC ....... H04Q 1/00; H04Q 3/0008; H04Q 11/00; H04Q 2213/13531; Y10S 379/901; H04L 12/46; H04L 12/4641; H04L 12/5692
USPC ......... 709/203, 218, 219, 220, 223, 227, 232, 709/238, 248
See application file for complete search history.

(56) References Cited

U.S. PATENT DOCUMENTS 7,307,990 B2   12/2007  Rosen et al.
7,469,294 B1 *  12/2008  Luo et al. ..................... 709/229
(Continued)

FOREIGN PATENT DOCUMENTS

| JP | 2005-010983 A | 1/2005 |
| JP | 2010-183506 A | 8/2010 |
| WO | 2006043463 A1 | 4/2006 |

OTHER PUBLICATIONS

Japanese Office Action in Japanese Application No. 2011-078835 dated Dec. 17, 2013.

*Primary Examiner* — Michael Y Won
(74) *Attorney, Agent, or Firm* — Mattingly & Malur, PC

(57) ABSTRACT

There is provided a load distribution function that enables an application of a user to be freely allocated to a machine even if an address of a terminal or the application used by the user is duplicated between VPNs for each user. An access detector of a machine allocation device detects a start packet from received communication packets, and determines the type of the start packet and the type of the application used by the terminal. A machine allocation manager determines a machine on which the determined application operates, and operates the machine. A network manager configures a user virtual network on a second virtual network between the determined machine and the machine allocation device.

20 Claims, 47 Drawing Sheets

(56) References Cited

U.S. PATENT DOCUMENTS

| | | | |
|---|---|---|---|
| 7,523,185 B1* | 4/2009 | Ng et al. | 709/223 |
| 7,660,624 B2* | 2/2010 | Georg et al. | 600/424 |
| 7,730,183 B2* | 6/2010 | Brown et al. | 709/226 |
| 8,040,814 B2* | 10/2011 | Takatori | 370/249 |
| 8,325,645 B2* | 12/2012 | Shiroko et al. | 370/312 |
| 2008/0037557 A1 | 2/2008 | Fujita et al. | |
| 2010/0054250 A1* | 3/2010 | Kitamura et al. | 370/392 |
| 2011/0138058 A1* | 6/2011 | Ishida | 709/227 |
| 2011/0164508 A1* | 7/2011 | Arai et al. | 370/245 |
| 2011/0235647 A1* | 9/2011 | Baba et al. | 370/401 |
| 2012/0254353 A1* | 10/2012 | Baba et al. | 709/217 |
| 2013/0073706 A1* | 3/2013 | Iijima et al. | 709/223 |
| 2013/0124750 A1* | 5/2013 | Anumala et al. | 709/232 |

* cited by examiner

| USER IDENTIFIER (K901) | port (K902) | VIRTUAL NETWORK 1 IDENTIFIER (K903) | SERVICE ID (K904) | SERVICE TYPE (K905) | SERVICE STATE (K906) | VIRTUAL NETWORK 2 IDENTIFIER (K907) |
|---|---|---|---|---|---|---|
| A | 1/1 | 100 | 1-1 | APPLICATION a (DLNA SERVER) | active | 1 |
|   |     |     | 2-1 | APPLICATION b (NAS) | inactive | NA |
|   |     |     | 3-1 | APPLICATION c | active | 1 |
| B | 1/1 | 200 | 1-2 | APPLICATION a (DLNA SERVER) | inactive | NA |
|   |     |     | 4-1 | APPLICATION d | inactive | NA |
| C | 1/1 | 300 | 2-2 | APPLICATION b (NAS) | active | 2 |
|   |     |     | 3-2 | APPLICATION c | inactive | NA |
| ... | ... | ... | ... | ... | ... | ... |

| MACHINE ID K1001 | VIRTUAL MACHINE ID K1002 | ALLOCATION SERVICE ID K1003 |
|---|---|---|
| PS1 | 1-1 | 1-1 |
| | 1-3 | 2-2 |
| PS2 | 2-1 | 3-1 |
| ... | ... | ... |

| MACHINE ID | MANAGEMENT ID | AVERAGE LOAD RATE | OPERATING VIRTUAL MACHINE ID |
|---|---|---|---|
| PS1 | 192.168.1.10 | 15% | 1-1 |
| | | | 1-3 |
| PS2 | 192.168.1.11 | 20% | 2-1 |
| ... | ... | ... | ... |

FIG.12

| NODE ID | port | CONNECTION NODE ID | VLAN ID |
|---|---|---|---|
| S1 | 0/1 | PS1 | 1, 2 |
|  | 1/1 | S3 | 1, 2 |
| S2 | 0/1 | PS2 | 1 |
|  | 1/1 | S3 | 1 |
| S3 | 0/1 | S1 | 1, 2 |
|  | 0/2 | S2 | 1 |
| LB1 | 1/1 | LB1 | 1, 2 |
| ... | 0/1 | S3 | 1, 2 |
|  | ... | ... | ... |

| HTTPMU | NOTIFY * HTTP/1.1<br>HOST:239.255.255.250:1900<br>:<br>NTS:ssdp:alive<br>:<br>ST:urn:schemas-upnp-org:device:MediaServer:1 |
|---|---|
| | UDP |
| IP | Src | 192.168.0.100 |
| | Dst | 239.255.255.250 |

| VIRTUAL NETWORK 1 SIDE | | VIRTUAL NETWORK 2 SIDE | |
|---|---|---|---|
| Port | IDENTIFIER | Port | IDENTIFIER |
| 1/1 | 100 | 0/1 | 1 |
| 1/1 | 200 | NA | NA |
| 1/1 | 300 | 0/1 | 2 |
| ... | ... | ... | ... |

FIG.17

| SERVICE ID | MACHINE ALLOCATION DEVICE | | | VIRTUAL NETWORK 2 | | |
|---|---|---|---|---|---|---|
| | ID | port | IP ADDRESS | IP ADDRESS | SPI (TRANSMISSION) | SPI (RECEPTION) |
| 1-1 | LB1 | 0/1 | 10.10.0.10 | 10.10.0.101 | 0x00000100 | 0x0001001 |
| 3-1 | LB1 | 0/1 | 10.10.0.10 | 10.10.0.102 | 0x00000101 | 0x0001002 |
| 2-2 | LB1 | 0/1 | 10.10.0.10 | 10.10.0.103 | 0x00000102 | 0x0001003 |
| ... | ... | ... | ... | ... | ... | ... |

FIG.21

| | VIRTUAL NETWORK 1 SIDE | | VIRTUAL NETWORK 2 SIDE | | T2301 |
|---|---|---|---|---|---|
| Port | IDENTIFIER | MAC | Port | IP | |
| 1/1 | 100 | 11-11-11-11-11-11 | 0/1 | 10.10.0.101 | |
| 1/1 | 200 | 11-11-11-11-11-22 | 0/1 | 10.10.0.103 | |
| 1/1 | 300 | NA | NA | NA | |
| ... | ... | 22-22-22-22-22-22 | 0/1 | 10.10.0.102 | |
| | | ... | ... | ... | |

THIRD EMBODIMENT

| USER IDENTIFIER (K901) | port (K902) | VIRTUAL NETWORK 1 IDENTIFIER (K2401) | SERVICE ID (K904) | SERVICE TYPE (K905) | SERVICE STATE (K906) | VIRTUAL NETWORK 2 IDENTIFIER (K907) |
|---|---|---|---|---|---|---|
| A | 1/1 | 10.10.1.1 | 1-1 | APPLICATION a (DLNA SERVER) | active | 1 |
|   |   |   | 2-1 | APPLICATION b (NAS) | inactive | NA |
|   |   |   | 3-1 | APPLICATION c | active | 1 |
| B | 1/1 | 10.10.1.2 | 1-2 | APPLICATION a (DLNASERVER) | inactive | NA |
|   |   |   | 4-1 | APPLICATION d | inactive | NA |
| C | 1/1 | 10.10.1.3 | 2-2 | APPLICATION b (NAS) | active | 2 |
|   |   |   | 3-2 | APPLICATION c | inactive | NA |
| ... | ... | ... | ... | ... | ... | ... |

| VIRTUAL NETWORK 1 SIDE | | VIRTUAL NETWORK 2 SIDE | |
|---|---|---|---|
| Port | IDENTIFIER | Port | IDENTIFIER |
| 1/1 | 10.10.0.1 | 0/1 | 1 |
| 1/1 | 10.10.0.2 | NA | NA |
| 1/1 | 10.10.0.3 | 0/1 | 2 |
| ... | ... | ... | ... |

FIG.26

FOURTH EMBODIMENT

| MACHINE ID (K1101) | MANAGEMENT IP (K1102) | AVERAGE LOAD RATE (K1103) | AVERAGE POWER CONSUMPTION (K2701) | POWER CONSUMPTION FUNCTION (K2702) | OPERATING VIRTUAL MACHINE ID (K1104) |
|---|---|---|---|---|---|
| PS1 | 192.168.1.10 | 15% | 300W | $f\Delta P1(P, \Delta L)$ | 1-1 |
|  |  |  |  |  | 1-3 |
| PS2 | 192.168.1.11 | 20% | 200W | $f\Delta P2(P, \Delta L)$ | 2-1 |
| PS3 | 192.168.1.12 | 0% | 0W | $f\Delta P3(P, \Delta L)$ | NA |
| ... | ... | ... | ... | ... | ... |

FIFTH EMBODIMENT

| NODE ID | port | CONNECTION DEVICE ID | VLAN ID | AVERAGE USE BANDWIDTH |
|---|---|---|---|---|
| S1 | 0/1 | PS1 | 1, 2 | 100Mbps |
|  | 1/1 | S3 | 1, 2 | 100Mbps |
| S2 | 0/1 | PS2 | 1 | 50Mbps |
|  | 1/1 | S3 | 1 | 50Mbps |
| S3 | 0/1 | S1 | 1, 2 | 100Mbps |
|  | 0/2 | S2 | 1 | 50Mbps |
|  | 1/1 | LB1 | 1, 2 | 150Mbps |
| LB1 | 0/1 | S3 | 1, 2 | 150Mbps |
| ... | ... | ... | ... | ... |

FIG.28

SIXTH EMBODIMENT

| USER IDENTIFIER | port | VIRTUAL NETWORK 1 IDENTIFIER | SERVICE ID | SERVICE TYPE | SERVICE STATE | VIRTUAL NETWORK 2 IDENTIFIER | SERVICE USE HISTORY | |
|---|---|---|---|---|---|---|---|---|
| | | | | | | | AVERAGE LOAD | AVERAGE USE TIME |
| A | 1/1 | 100 | 1-1 | APPLICATION a (DLNA SERVER) | active | 1 | 10 | 30minutes |
| | | | 2-1 | APPLICATION b (NAS) | inactive | NA | 5 | 200minutes |
| | | | 3-1 | APPLICATION c | active | 1 | 30 | 10minutes |
| B | 1/1 | 200 | 1-2 | APPLICATION a (DLNA SERVER) | inactive | NA | 5 | 100minutes |
| | | | 4-1 | APPLICATION d | inactive | NA | 20 | 50minutes |
| C | 1/1 | 300 | 2-2 | APPLICATION b (NAS) | active | 2 | 15 | 5minutes |
| | | | 3-2 | APPLICATION c | inactive | NA | 20 | 300minutes |
| ... | ... | ... | ... | ... | ... | ... | ... | ... |

FIG.29

| NODE ID | port | CONNECTION NODE ID | VLAN ID |
|---|---|---|---|
| S1 | 0/1 | PS1 | 1, 2, 3 |
| | 1/1 | S3 | 1, 2, 3 |
| S2 | 0/1 | PS2 | 1 |
| | 1/1 | S3 | 1 |
| S3 | 0/1 | S1 | 1, 2, 3 |
| | 0/2 | S2 | 1 |
| | 1/1 | LB1 | 1, 2, 3 |
| LB1 | 0/1 | S3 | 1, 2, 3 |
| ... | ... | ... | ... |

FIG.39

| VIRTUAL NETWORK 1 SIDE | | VIRTUAL NETWORK 2 SIDE | |
|---|---|---|---|
| Port | IDENTIFIER | Port | IDENTIFIER |
| 1/1 | 100 | 0/1 | 1 |
| 1/1 | 200 | 0/1 | 3 |
| 1/1 | 300 | 0/1 | 2 |
| ... | ... | ... | ... |

FIG.40

| USER IDENTIFIER K901 | port K902 | VIRTUAL NETWORK 1 IDENTIFIER K903 | SERVICE ID K904 | SERVICE TYPE K905 | SERVICE STATE K906 | VIRTUAL NETWORK 2 IDENTIFIER K907 |
|---|---|---|---|---|---|---|
| A | 1/1 | 100 | 1-1 | APPLICATION a (DLNA SERVER) | active | 1 |
|  |  |  | 2-1 | APPLICATION b (NAS) | inactive | NA |
|  |  |  | 3-1 | APPLICATION c | active | 1 |
| B | 1/1 | 200 | 1-2 | APPLICATION a (DLNA SERVER) | active | 3 |
|  |  |  | 4-1 | APPLICATION d | inactive | NA |
| C | 1/1 | 300 | 2-2 | APPLICATION b (NAS) | active | 2 |
|  |  |  | 3-2 | APPLICATION c | inactive | NA |
| ... | ... | ... | ... | ... | ... |  |

| SERVICE ID | MACHINE ALLOCATION DEVICE | | | VIRTUAL NETWORK 2 | | |
|---|---|---|---|---|---|---|
| | ID | port | IP ADDRESS | IP ADDRESS | SPI (TRANSMISSION) | SPI (RECEPTION) |
| 1-1 | LB1 | 0/1 | 10.10.0.10 | 10.10.0.101 | 0x00000100 | 0x0001001 |
| 3-1 | LB1 | 0/1 | 10.10.0.10 | 10.10.0.102 | 0x00000101 | 0x0001002 |
| 2-2 | LB1 | 0/1 | 10.10.0.10 | 10.10.0.103 | 0x00000102 | 0x0001003 |
| 1-2 | LB1 | 0/1 | 10.10.0.10 | 10.10.0.104 | 0x00000103 | 0x0001004 |
| ... | ... | ... | ... | ... | ... | ... |

FIG.42

| Port K1701 | VIRTUAL NETWORK 1 SIDE K2301 | | VIRTUAL NETWORK 2 SIDE K2302 T2301 | |
| --- | --- | --- | --- | --- |
| | IDENTIFIER K1702 | MAC | Port K1703 | IP |
| 1/1 | 100 | 11-11-11-11-11-11 | 0/1 | 10.10.0.101 |
| | | 11-11-11-11-11-22 | 0/1 | 10.10.0.103 |
| 1/1 | 200 | 22-22-22-22-22-11 | 0/1 | 10.10.0.104 |
| 1/1 | 300 | 22-22-22-22-22-22 | 0/1 | 10.10.0.102 |
| ... | ... | ... | ... | ... |

| VIRTUAL NETWORK 1 SIDE | | VIRTUAL NETWORK 2 SIDE | |
|---|---|---|---|
| Port | IDENTIFIER | Port | IDENTIFIER |
| 1/1 | 10.10.0.1 | 0/1 | 1 |
| 1/1 | 10.10.0.2 | 0/1 | 3 |
| 1/1 | 10.10.0.3 | 0/1 | 2 |
| ... | ... | ... | ... |

| MACHINE ID | VIRTUAL MACHINE ID | ALLOCATION SERVICE ID |
|---|---|---|
| PS1 | 1-1 | 1-1 |
|  | 1-2 | 1-2 |
|  | 1-3 | 2-2 |
| PS2 | 2-1 | 3-1 |
| ... | ... | ... |

| USER IDENTIFIER | port | VIRTUAL NETWORK 1 IDENTIFIER | SERVICE ID | SERVICE TYPE | SERVICE STATE | VIRTUAL NETWORK 2 IDENTIFIER | | |
|---|---|---|---|---|---|---|---|---|
| | | | | | | IP ADDRESS | SPI (TRANSMISSION) | SPI (RECEPTION) |
| A | 1/1 | 100 | 1-1 | APPLICATION a (DLNA SERVER) | active | 10.10.0.101 | 0x00000100 | 0x0001001 |
| | | | 2-1 | APPLICATION b (NAS) | inactive | NA | NA | NA |
| | | | 3-1 | APPLICATION c | active | 10.10.0.102 | 0x00000101 | 0x0001002 |
| B | 1/1 | 200 | 1-2 | APPLICATION a (DLNA SERVER) | inactive | NA | NA | NA |
| | | | 4-1 | APPLICATION d | inactive | NA | NA | NA |
| C | 1/1 | 300 | 2-2 | APPLICATION b (NAS) | active | 10.10.0.103 | 0x00000102 | 0x0001003 |
| | | | 3-2 | APPLICATION d | inactive | NA | NA | NA |
| ... | | | ... | ... | ... | ... | ... | ... |

K901 K902 K903 K904 K905 K906 K2105 K2106 K2107

| USER IDENTIFIER | port | VIRTUAL NETWORK 1 IDENTIFIER | SERVICE ID | SERVICE TYPE | SERVICE STATE | VIRTUAL NETWORK 2 IDENTIFIER | | |
|---|---|---|---|---|---|---|---|---|
| | | | | | | IP ADDRESS | SPI (TRANSMISSION) | SPI (RECEPTION) |
| A | 1/1 | 100 | 1-1 | APPLICATION a (DLNA SERVER) | active | 10.10.0.101 | 0x00000100 | 0x0001001 |
| | | | 2-1 | APPLICATION b (NAS) | inactive | NA | NA | NA |
| | | | 3-1 | APPLICATION c | active | 10.10.0.102 | 0x00000101 | 0x0001002 |
| B | 1/1 | 200 | 1-2 | APPLICATION a (DLNA SERVER) | active | 10.10.0.104 | 10.10.0.103 | 10.10.0.104 |
| | | | 4-1 | APPLICATION d | inactive | NA | NA | NA |
| C | 1/1 | 300 | 2-2 | APPLICATION b (NAS) | active | 10.10.0.103 | 0x00000102 | 0x0001003 |
| | | | 3-2 | APPLICATION d | inactive | NA | NA | NA |
| ... | | | ... | ... | ... | ... | ... | ... |

FIG.47

NETWORK SYSTEM, MACHINE ALLOCATION DEVICE AND MACHINE ALLOCATION METHOD

CLAIM OF PRIORITY

The present application claims priority from Japanese patent application JP 2011-078835 filed on Mar. 31, 2011, the content of which is hereby incorporated by reference into this application.

BACKGROUND

The present invention relates to a network system, a machine allocation device, and a machine allocation method. In particular, the present invention relates to a load distribution technique for a machine (a computer, a computing machinery) where a machine on which an application used by a user operates is allocated from plural machines, and more particularly to a machine allocation technique in which an application on a machine which is arranged in a data center or the like is used from a user's home such as a standard home over a wide area virtual private network (VPN).

In recent years, with an increase in the use of portable video reproduction or music reproduction terminals, or network compatible televisions, in user sides such as a user's home such as a standard home, outdoors, or public facilities, contents such as videos, music, or document files are available by any terminal at any point. Thus, in order to make the contents available by any terminal anywhere, there is a need to install a distribution server that holds and distributes the contents. Usually, in the use in the standard home, a network within the home, that is, a home area network (HAN) is connected with the terminal and the distribution server. In recent years, there is a device that can receive the distribution of the contents from the distribution server within the home from a place other than the home over the Internet. The distribution sever of this type is exemplified by a media distribution server standard "digital living network alliance (DLNA)" and "common internet file system (CIFS)" of a file server. However, when the content distribution server is installed in the user's home as described above, there arise the following problems. That is, an expert knowledge of a network server is required to configure the HAN or the distribution server, thereby making such a configuration difficult. There is a need to increase the number of distribution servers every time a storage capacity for holding the contents becomes short. There is a need to install the distribution server for each service. A user must deal with a failure of the distribution server. In order to solve the above problems, in the future, there is being used a service that is so-called "cloud service" which is distributed to the user terminals over a wide area network such as the Internet in which the distribution server is not installed within the home, but installed within a center (hereinafter also called "data center") which is operated by a service provider such as a communication carrier or a content provider. When the distribution server is thus installed in the data center, since the service provider configures the distribution server and deals with the failure of the distribution server, the user can easily use the distribution server even if the user has no expert knowledge. Also, because an increase in the storage capacity and service variation can be dealt with by addition of the device on the data center side, the user can use the service upon merely requesting the service. The internet is conceivable as a network for connecting the data center and the home. However, in order to realize the same usability as that of the network HAN within the home of the user, there is a need to configure layer 2-virtual private network (L2-VPN) which is a user dedicated identical internet protocol (IP) domain between the data center and the home. As a technique for configuring such an L2-VPN in the wide area, there are provider backbone bridging (PBB), virtual private LAN service (VPLS), and security architecture for internet protocol (IPsec).

The Ethernet (registered trademark) based wide area network of this type is disclosed in U.S. Pat. No. 7,307,990 B2, "SHARD COMMUNICATIONS NETWORK EMPLOYING VIRTUAL-PRIVATE-NETWORK IDENTIFIERS".

SUMMARY

As described above, when a machine installed in the data center is used from a user terminal within a distant home, if one machine is provided for each application used by a user, the machines of (the number of users)×(the number of applications) are required. This makes enormous device costs incurred by the service provider that operates the data center, and operation costs of the device. Accordingly, there is a need to aggregate plural users and applications in one machine to reduce the costs.

The present inventors have found that there arise the following problems in order to aggregate the plural users and applications in one machine when the machine installed in the data center is used from the user terminal within the distant home as described above. In order to provide the applications to the users on a scale of several thousands, plural machines are normally configured within the data center. In order to efficiently use the plural machines, the applications of the users are not fixedly allocated to the machines, but need to be freely allocated for load distribution. However, as described above, because the user communicates with the machine within the data center by the L2-VPN independent for each user, the allocation of the machines among the plural L2-VPNs is problematic. Also, because the user can freely designate an IP address to the distribution server that operates on the machine as a device disposed within the HAN, there is a possibility that the IP address of the server on the machine is duplicated between the users. The allocation of the machine when the IP address is duplicated is problematic. Also, because it is conceivable that the service provider provides plural services to the user, that the service provider must deal with the plural services such as a media server or a file server is problematic. In a related art load distribution device, because the load distribution can be conducted only among the plural machines within the same IP domain, the above problems cannot be solved.

The related art load distribution device of this type is disclosed in "a server load distribution method, a load distribution system, and a load distribution device and a server which are used in the system" of JP-A-2005-10983.

In the above description, the content distribution server is exemplified. However, the same problems arise in a case where the service provided by the machine installed in the data center is used from a distant place over the network. There are other cases in which an electricity meter installed within the home uses an electricity meter control server disposed in the data center, and a sensor or a camera disposed on a telephone pole facing a road uses a sensor/camera control server disposed in the data center.

The present invention has been made in view of the above circumstances, and therefore aims at providing a load distribution function that enables an application of a user to be freely allocated to a machine in a network system where an address such as an IP address of a terminal or the application used by the user is duplicated between VPNs such as L2-VPNs for each user.

The other objects and novel features of the present invention will become from the description of the present specification and the attached drawings.

In order to solve the above problem, according to one aspect of the present invention, there is provided a network system having a machine allocation device described below. That is, there is provided a network system having a machine allocation device which is connected to a first virtual network configuring a virtual network for each user which connects a terminal of a user, and a second virtual network configuring a virtual network for each user which connects plural machines on which an application used from the terminal by the user operates, wherein in the machine allocation device, a transfer processor that relays a communication packet of the user between the first virtual network and the second virtual network includes a packet detector that detects the communication packet transmitted from the terminal and received over the first virtual network when the user starts to use the terminal, an access detector includes a start packet detection/type determination unit that analyzes data of the received communication packet, detects a start packet transmitted when the terminal starts, and determines a type of the start packet and a type of the application used by the terminal, and user service information including at least information of a type of the application allocatable for each user and an operation state of the application, a machine allocation manager includes a machine allocation determination unit that determines the machine on which the determined application operates, a machine controller that allows the application to operate on the determined machine, and machine allocation information including at least information indicative of the machine on which the application provided to the user operates, and a network manager includes a second virtual network controller that configures the virtual network for the user on the second virtual network between the determined machine and the machine allocation device.

Also, according to another aspect of the present invention, there is provided a machine allocation method for a machine allocation device described below. That is, there is provided a machine allocation method for a machine allocation device which is connected to a first virtual network configuring a virtual network for each user which connects a terminal of a user, and a second virtual network configuring a virtual network for each user which connects plural machines on which an application used from the terminal by the user operates, wherein when the user does not use the terminal, the application used by the terminal does not operate on the machine, and when the user starts to use the terminal, the machine allocation method includes the steps of:

detecting a communication packet transmitted from the terminal and received over the first virtual network, determining a type of the application used by the user according to information on the detected communication packet, determining the machine on which the determined application operates from the plural machines, configuring the virtual network for the user on the second virtual network between the determined machine and the machine allocation device, operating the application on the machine, and relaying and transferring the communication packet of the user between the first virtual network and the second virtual network.

As described above, because the machine on which the application operates is allocated to the user in the system extending over plural VPNs such as the L2-VPNs where the IP addresses are duplicated, the machine is dynamically allocated when the user uses the application, and a user dedicated virtual network within a data center is dynamically configured for connecting the machine to which the application is allocated and the terminal of the user. With the above configuration, the above problem can be solved.

According to the first solving means of the present invention, there is provided a network system having a first virtual network configuring a virtual network for each user which is connected to a terminal of the user, a plurality of machines on which applications to be used from the terminal by the user operate, and a second virtual network configuring a virtual network for each user which is connected to the plurality of machines, the network system comprising:

a machine allocation device that is connected to the first virtual network and the second virtual network, wherein the machine allocation device includes:

a transfer processor that relays communication packets of the user between the first virtual network and the second virtual network;

an access detector that detects an access from the user;

a machine allocation manager that determines any one of the plurality of machines;

a network manager that manages the network;

a user service information storage unit that stores user service information including a service state indicative of an operating state of each application and a second virtual network identification information indicative of an identifier of each user over the second virtual network, in correspondence with a preset first virtual network identifier indicative of the identifier of the user over the first virtual network, a preset service identifier for identifying each application providing a service to the user, and a preset service type indicative of each allocatable application;

a machine allocation information storage unit that stores machine allocation information including a virtual machine identifier for identifying a virtual machine on which the application operates and a service identifier for identifying the application that operates on the virtual machine, in correspondence with a preset machine identifier;

a relay information storage unit that stores relay information including an identification information on a second virtual network side, in correspondence with an identification information on a first virtual network side; and a second virtual network information storage unit that stores the second virtual network identification information configuring a user virtual network over the second virtual network between the machine and the machine allocation device, wherein the transfer processor detects a communication packet transmitted from the terminal and received through the first virtual network, the access detector detects a start packet to be sent when starting the terminal from the received communication packet, determines the first virtual network identifier and the service type indicative of the application to be used by the terminal according to information on the communication packet and the start packet, and obtains the service state on the basis of the first virtual network identifier and the service type with reference to the user service information, when the service state is non-allocated or stopping, the machine allocation manager determines the machine on which the determined application operates according to a predetermined procedure, and specifies the virtual machine on the determined machine, the network manager obtains non-allocated virtual network identification information in one or a plurality of entries indicative of a connection between the determined machine and the machine allocation device, with reference to the second virtual network information, the network manager adds the virtual network identification information to the one or the plurality of entries of the second virtual network information or another entry of the second virtual network information, and updates the virtual network identification information to configure the user virtual network on the second virtual network, the machine allocation manager starts the specified virtual machine on the machine, and operates the application, the machine allocation manager sets the virtual network identification information to the identification information on the second virtual network side corresponding to the first virtual network identifier with respect to the relay information and, for an entry corresponding to the first virtual network identifier and the service type with respect to the user service information, sets the service state to be allocated or to be operating and sets the virtual network identification information to the second network identifier, and sets the virtual machine identifier of the started virtual machine and the service identifier with respect to the machine allocation information, and the transfer processor transfers the communication packet of the user between the first virtual network and the second virtual network on the basis of the relay information.

According to the second solving means of the present invention, there is provided a machine allocation device that is connected to a first virtual network and a second virtual network in a network system having the first virtual network configuring a virtual network for each user which is connected to a terminal of the user, a plurality of machines on which applications to be used from the terminal by the user operate, and the second virtual network configuring a virtual network for each user which is connected to the plurality of machines, the machine allocation device includes:

a transfer processor that relays communication packets of the user between the first virtual network and the second virtual network;

an access detector that detects an access from the user;

a machine allocation manager that determines any one of the plurality of machines;

a network manager that manages the network;

a user service information storage unit that stores user service information including a service state indicative of an operating state of each application and a second virtual network identification information indicative of an identifier of each user over the second virtual network, in correspondence with a preset first virtual network identifier indicative of the identifier of the user over the first virtual network, a preset service identifier for identifying each application providing a service to the user, and a preset service type indicative of each allocatable application;

a machine allocation information storage unit that stores machine allocation information including a virtual machine identifier for identifying a virtual machine on which the application operates and a service identifier for identifying the application that operates on the virtual machine, in correspondence with a preset machine identifier;

a relay information storage unit that stores relay information including an identification information on a second virtual network side, in correspondence with an identification information on a first virtual network side; and a second virtual network information storage unit that stores the second virtual network identification information configuring a user virtual network over the second virtual network between the machine and the machine allocation device, wherein the transfer processor detects a communication packet transmitted from the terminal and received through the first virtual network, the access detector detects a start packet to be sent when starting the terminal from the received communication packet, determines the first virtual network identifier and the service type indicative of the application to be used by the terminal according to information on the communication packet and the start packet, and obtains the service state on the basis of the first virtual network identifier and the service type with reference to the user service information, when the service state is non-allocated or stopping, the machine allocation manager determines the machine on which the determined application operates according to a predetermined procedure, and specifies the virtual machine on the determined machine, the network manager obtains non-allocated virtual network identification information in one or a plurality of entries indicative of a connection between the determined machine and the machine allocation device, with reference to the second virtual network information, the network manager adds the virtual network identification information to the one or the plurality of entries of the second virtual network information or another entry of the second virtual network information, and updates the virtual network identification information to configure the user virtual network on the second virtual network, the machine allocation manager starts the specified virtual machine on the machine, and operates the application, the machine allocation manager sets the virtual network identification information to the identification information on the second virtual network side corresponding to the first virtual network identifier with respect to the relay information and, for an entry corresponding to the first virtual network identifier and the service type with respect to the user service information, sets the service state to be allocated or to be operating and sets the virtual network identification information to the second network identifier, and sets the virtual machine identifier of the started virtual machine and the service identifier with respect to the machine allocation information, and the transfer processor transfers the communication packet of the user between the first virtual network and the second virtual network on the basis of the relay information.

According to the third solving means of the present invention, there is provided a machine allocation method for a machine allocation device that is connected to a first virtual network and a second virtual network in a network system having the first virtual network configuring a virtual network for each user which is connected to a terminal of the user, a plurality of machines on which applications to be used from the terminal by the user operate, and the second virtual network configuring a virtual network for each user which is connected to the plurality of machines, wherein the machine allocation device includes:

a transfer processor that relays communication packets of the user between the first virtual network and the second virtual network;

an access detector that detects an access from the user;

a machine allocation manager that determines any one of the plurality of machines;

a network manager that manages the network;

a user service information storage unit that stores user service information including a service state indicative of an operating state of each application and a second virtual network identification information indicative of an identifier of each user over the second virtual network, in correspondence with a preset first virtual network identifier indicative of the identifier of the user over the first virtual network, a preset service identifier for identifying each application providing a service to the user, and a preset service type indicative of each allocatable application;

a machine allocation information storage unit that stores machine allocation information including a virtual machine identifier for identifying a virtual machine on which the application operates and a service identifier for identifying the application that operates on the virtual machine, in correspondence with a preset machine identifier;

a relay information storage unit that stores relay information including an identification information on a second virtual network side, in correspondence with an identification information on a first virtual network side; and a second virtual network information storage unit that stores the second virtual network identification information configuring a user virtual network over the second virtual network between the machine and the machine allocation device, wherein the transfer processor detects a communication packet transmitted from the terminal and received through the first virtual network, the access detector detects a start packet to be sent when starting the terminal from the received communication packet, determines the first virtual network identifier and the service type indicative of the application to be used by the terminal according to information on the communication packet and the start packet, and obtains the service state on the basis of the first virtual network identifier and the service type with reference to the user service information, when the service state is non-allocated or stopping, the machine allocation manager determines the machine on which the determined application operates according to a predetermined procedure, and specifies the virtual machine on the determined machine, the network manager obtains non-allocated virtual network identification information in one or a plurality of entries indicative of a connection between the determined machine and the machine allocation device, with reference to the second virtual network information, the network manager adds the virtual network identification information to the one or the plurality of entries of the second virtual network information or another entry of the second virtual network information, and updates the virtual network identification information to configure the user virtual network on the second virtual network, the machine allocation manager starts the specified virtual machine on the machine, and operates the application, the machine allocation manager sets the virtual network identification information to the identification information on the second virtual network side corresponding to the first virtual network identifier with respect to the relay information and, for an entry corresponding to the first virtual network identifier and the service type with respect to the user service information, sets the service state to be allocated or to be operating and sets the virtual network identification information to the second network identifier, and sets the virtual machine identifier of the started virtual machine and the service identifier with respect to the machine allocation information, and the transfer processor transfers the communication packet of the user between the first virtual network and the second virtual network on the basis of the relay information.

The advantages obtained by the typical features of the present invention disclosed in the present application will be described in brief below.

(1) Because the machine can be allocated to the user over the virtual network allocated to each user, the allocation of the user to the machine can be more flexibly conducted than the allocation of the machine to the user within the virtual network. As a result, the machine can be efficiently used, resulting in a reduction in the number of machines.

(2) Because a server storage that holds the content used by the user within the home can be deployed on the data center side, a copyright protection policy for the content can be centrally controlled.

These and other benefits are described throughout the present specification. A further understanding of the nature and advantages of the invention may be realized by reference to the remaining portions of the specification and the attached drawings.

BRIEF DESCRIPTION OF THE DRAWINGS

FIG. 9 is an illustrative view illustrating an example of user service information held by the machine allocation device according to the first embodiment;

FIG. 10 is an illustrative view illustrating an example of machine allocation information held by the machine allocation device according to the first embodiment;

FIG. 11 is an illustrative view illustrating an example of machine information held by the machine allocation device according to the first embodiment;

FIG. 12 is an illustrative view illustrating an example of information on the virtual network 2 held by the machine allocation device according to the first embodiment;

FIG. 15 is an illustrative view illustrating an example of a format of a start packet according to the first embodiment;

FIG. 17 is an illustrative view illustrating an example of relay information between the virtual networks according to the first embodiment;

FIG. 21 is an illustrative view illustrating an example of information on the virtual network 2 held by a machine allocation device according to the second embodiment;

FIG. 23 is an illustrative view illustrating an example of relay information between the virtual networks according to the second embodiment;

FIG. 24 is an illustrative view illustrating an example of user service information held by a machine allocation device according to a third embodiment;

FIG. 26 is an illustrative view illustrating an example of relay information between the virtual networks according to the third embodiment;

FIG. 27 is an illustrative view illustrating an example of machine information held by a machine allocation device according to a fourth embodiment;

FIG. 28 is an illustrative view illustrating an example of information on the virtual network 2 held by the machine allocation device;

FIG. 29 is an illustrative view illustrating an example of user service information held by a machine allocation device according to a sixth embodiment;

FIG. 39 is an illustrative view illustrating an example of information on the virtual network 2 (after updated) held by the machine allocation device according to the first embodiment;

Figure 40:
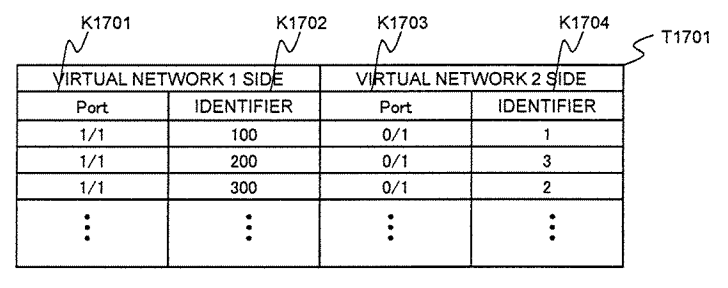

FIG. 40 is an illustrative view illustrating an example of the relay information (after updated) between the virtual networks according to the first embodiment;

FIG. 41 is an illustrative view illustrating an example of user service information (after updated) held by the machine allocation device according to the first embodiment;

FIG. 42 is an illustrative view illustrating an example of information on the virtual network 2 (after updated) held by the machine allocation device according to the second embodiment;

FIG. 43 is an illustrative view illustrating an example of the relay information (after updated) between the virtual networks according to the second embodiment;

FIG. 44 is an illustrative view illustrating an example of the relay information (after updated) between the virtual networks according to the third embodiment;

FIG. 45 is an illustrative view illustrating an example of machine allocation information (after updated) held by the machine allocation device according to the first embodiment;

FIG. 46 is an illustrative view illustrating an example of user service information held by the machine allocation device according to the second embodiment; and FIG. 47 is an illustrative view illustrating an example of user service information (after updated) held by the machine allocation device according to the second embodiment.

DETAILED DESCRIPTION OF THE EMBODIMENTS

Figure 1:
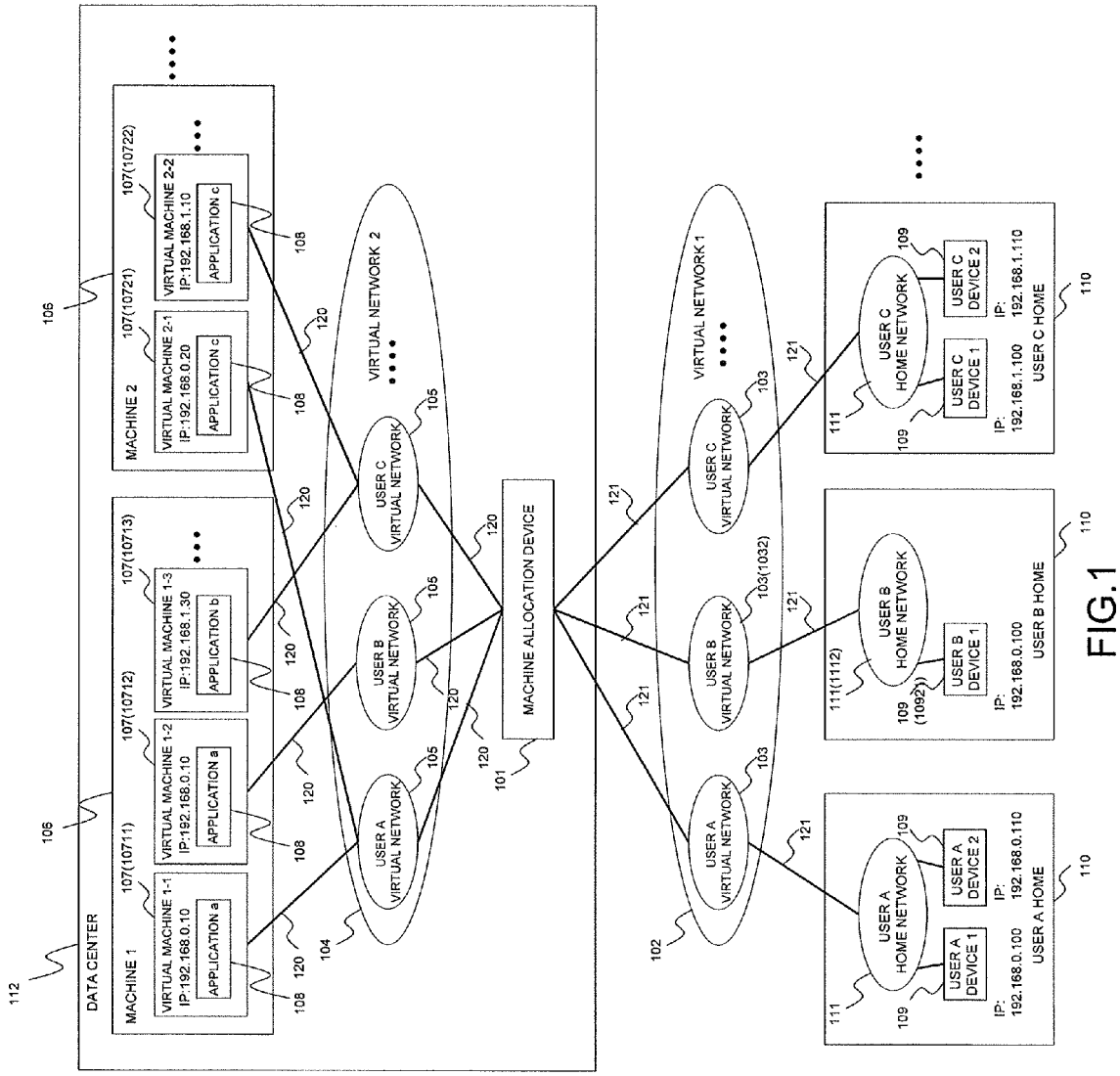
FIG. 1 is a diagram illustrating a system configuration according to a first embodiment.

Hereinafter, embodiments of the present invention will be described in detail with reference to the accompanying drawings below. In all of the drawings for illustrating the embodiments, the same members are denoted by identical reference numerals in principle, and their repetitive description will be omitted in principle.

A. First Embodiment

1. System

Figure 2:
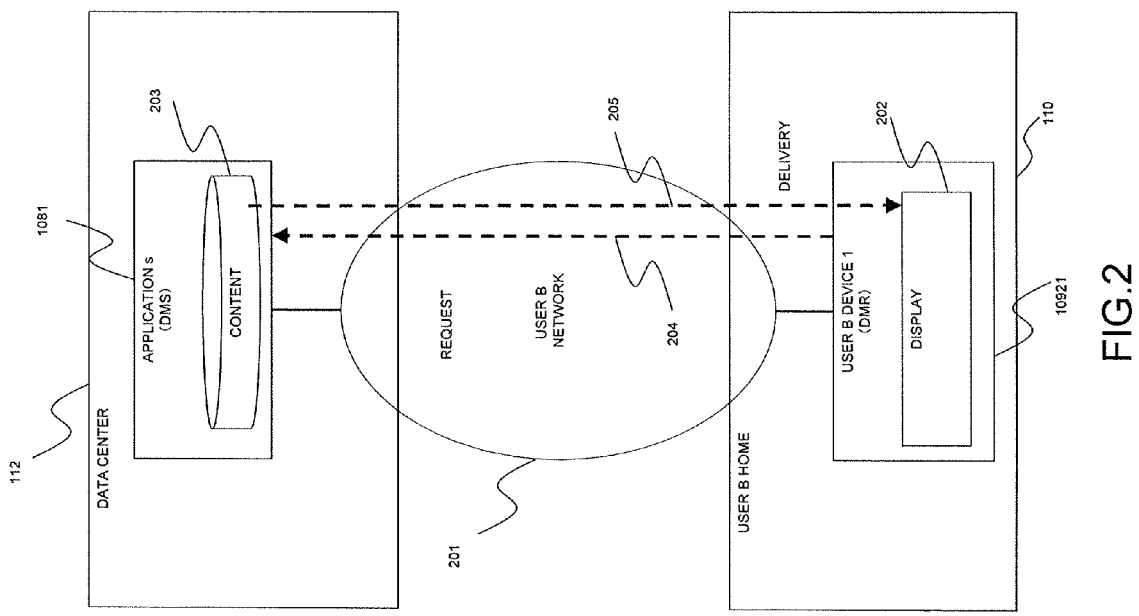
FIG. 2 is an illustrative view illustrating an example in which a user B uses a service according to the first embodiment.
Figure 3:
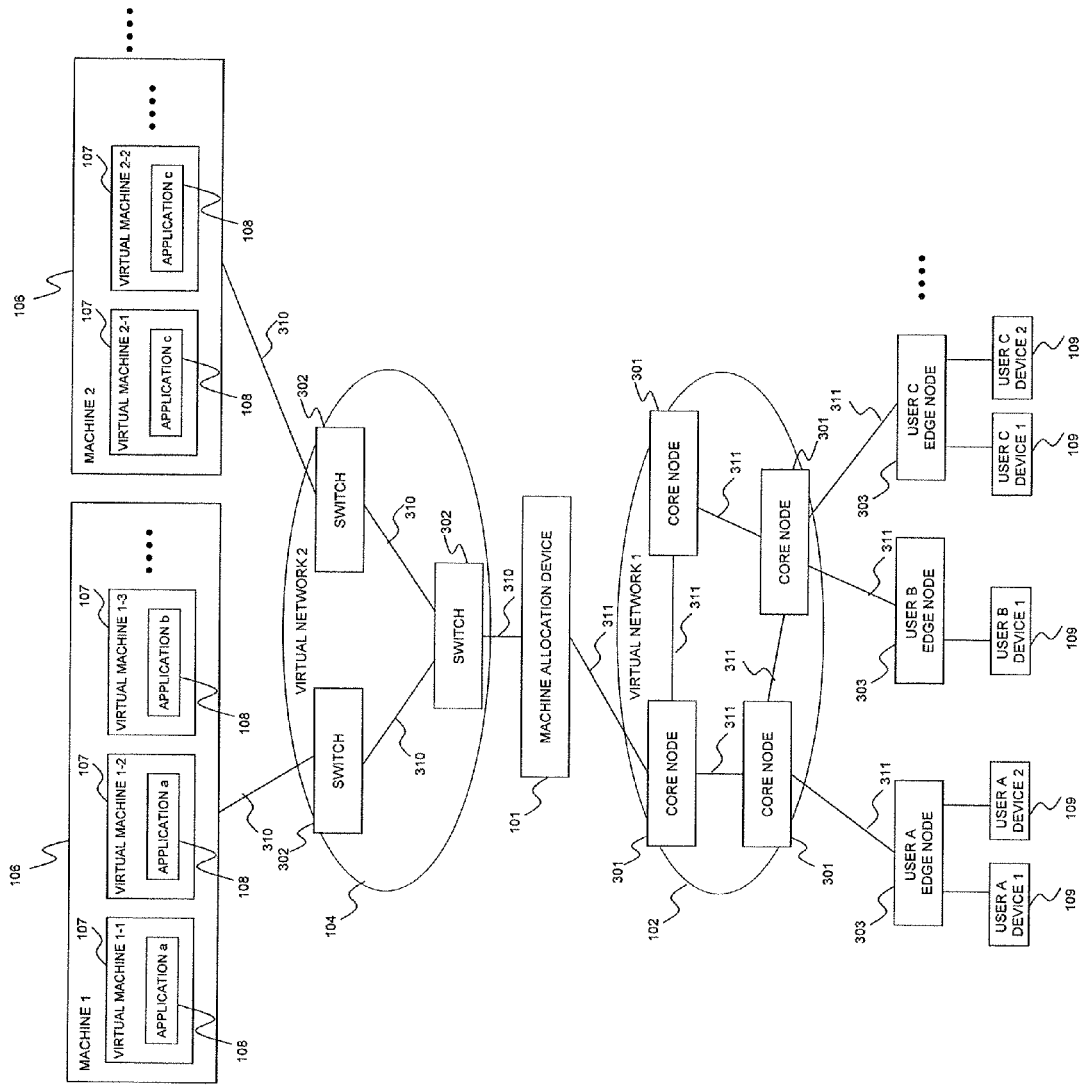
FIG. 3 is a diagram illustrating a physical configuration of a system according to the first embodiment.

First, a system using a machine allocation device according to a first embodiment of the present invention will be described. First, a description will be given of an overall picture of service provision in the system using the machine allocation device according to the first embodiment of the present invention with reference to FIGS. 1 to 3. FIG. 1 is a diagram illustrating a system configuration according to the first embodiment of the present invention, FIG. 2 is an illustrative view illustrating an example in which a user B uses a service according to the first embodiment of the present invention, and FIG. 3 is a diagram illustrating a physical configuration of the system according to the first embodiment of the present invention. In a system using the service according to this embodiment, user devices (terminals) 109 in homes 110 which are user's homes typically use services provided by applications 108 that operate on machines 106 installed in a data center 112 operated by a content provider or a communication carrier provider.

For simplification, FIG. 1 illustrates an example in which users A, B, and C as the users use the services provided by two machines 106. In fact, it is assumed that the number of users and the number of machines are larger. Also, in FIG. 1, each user uses the service from the home 110 of the user. However, if the same configuration is applied, the service may be used at a location other than the homes 110. For example, the service may be used outdoors using a portable terminal, or used in a facility such as a workplace or a public facility other than the home. Any services are applicable in this embodiment if the services use machine resources. For example, there are a media server that delivers music or video, a file server that saves electronic documents, a tally server that tallies power consumption from an electricity meter or an electric device in home, and a control server that conducts a power control or a charging control of the electric device.

As illustrated in FIG. 2, in an example of the media server, an application s (1081) on a data center side is a server "digital media server (DMS)" complying with a standard "Digital Living Network Alliance (DLNA)". A user B device 1 10921 is a television (TV) corresponding to the DLNA, that is, a digital media renderer (DMR). A DLNA server 1082 of the data center 112 and the user B device 1 (TV) 10921 are connected by a network 201 of a user B dedicated layer 2-virtual private network (L2-VPN). For that reason, the user B can use the DLNA server 1082 installed in the distant data center 112 in the same manner as that of the server installed in a home 1102. That is, the user can receive a delivery 205 of a video content 203 on the DLNA server 1082 in response to a request 204 from the user B device 1 (TV) 10921 to receive a service that allows a video to be displayed on a display 202. This use form is a feature of the service in this embodiment. Because the DLNA server 1081 of the data center 112 and the user B device 1 (TV) 10921 are connected by a network, a network is so configured as to extend over a home network 111, a virtual network 1 (102) which is a wide area network between the home 110 and the data center 112, and a virtual network 2 (104) that is a network within the data center 112.

As illustrated in FIG. 3, a physical configuration of each network will be described below. The virtual network 1 (102) includes plural core nodes 301 having switches and routers. Edge nodes 303 are arranged between the virtual network 1 (102) and the home networks 111 to transfer communication packets between those two networks. An example of FIG. 3 illustrates a simple configuration in which the user devices 109 are connected to the edge nodes 303. Alternatively, the edge nodes 303 and the user devices 109 may be cascade-connected by switches. In this example, reference numeral 311 denotes a physical connection between the nodes. On the other hand, the virtual network 2 (104) includes at least one switch 302, and is connected to the machines 106. In this example, reference numeral 310 denotes a physical connection between the switches.

The homes 110 is a network separated for each user. The virtual network 1 (102) and the virtual network 2 (104) are shared by plural users, thereby configuring a network separated by each user through the virtual networks. As illustrated in FIG. 1, the virtual network 1 (102) configures a virtual network 103 for each user, and the virtual network 2 (104) configures a virtual network 105 for each user. In the case of the media server of the user B, the user B device 1 10921 is connected to an application a (1081) of a virtual machine 10712 in a machine 1061 through a user B home network 1112, a virtual network 1032 of the virtual network 1 (102), and the virtual network 2 (104). Thus, the L2-VPN network 201 is configured for each user, thereby enabling the allocation of an IP addresses of the same IP segment such as an IP address: 192.168.0.100 of the user B device 1 10921 and an IP address: 192.168.0.10 of the virtual machine 10721. Also, because the L2-VPN is independent for each user, as illustrated in FIG. 1, the IP address can be duplicated between the users, such as the IP address: 192.168.0.10 of a virtual machine 10711 of the user A, and the IP address: 192.168.0.10 of the virtual machine 10721 of the user B. In this example, reference numeral 121 denotes a logical connection of the virtual network 1 (102), and reference numeral 120 denotes a logical connection of the virtual network 2 (104). Also, in this embodiment, the applications 108 of the plural users are aggregated in each of the machines 106. This is because when the plural applications operate on one machine, the machines are efficiently used to reduce the number of machines, and costs of the service system are reduced. As a method of operating the plural applications separated for each user on one machine, there is a method using virtual machines 107 as illustrated in FIG. 1. As the virtual machine, for example, vSphere made by VMware Inc. has been well known. In the example of FIG. 1, the virtual machines 10711 and 10721 are allocated to the user A, the virtual machine 10712 is allocated to the user B, and virtual machines 10713 and 10722 are allocated to the user C. Because how to use the applications 108 of the users is irregular, in order to enhance the use efficiency of the machines, there is a need to change the applications 108 to be allocated to the machines and the users according to an operating state of the applications 108. In this embodiment, a machine allocation device 101 is disposed between the virtual network 1 (102) and the virtual network 2 (104). When the user device 109 in the home 110 of each user starts, and accesses to any application 108 in the data center 112, the machine 106 on which the application 108 operates is determined to start the application 108 and configure the corresponding virtual network 105 for each user between the application 108 and the machine allocation device 101. With the above configuration, the machine 106 on which the applications 108 of each user operates can be dynamically changed.

2. Machine Allocation Device

Figure 4:
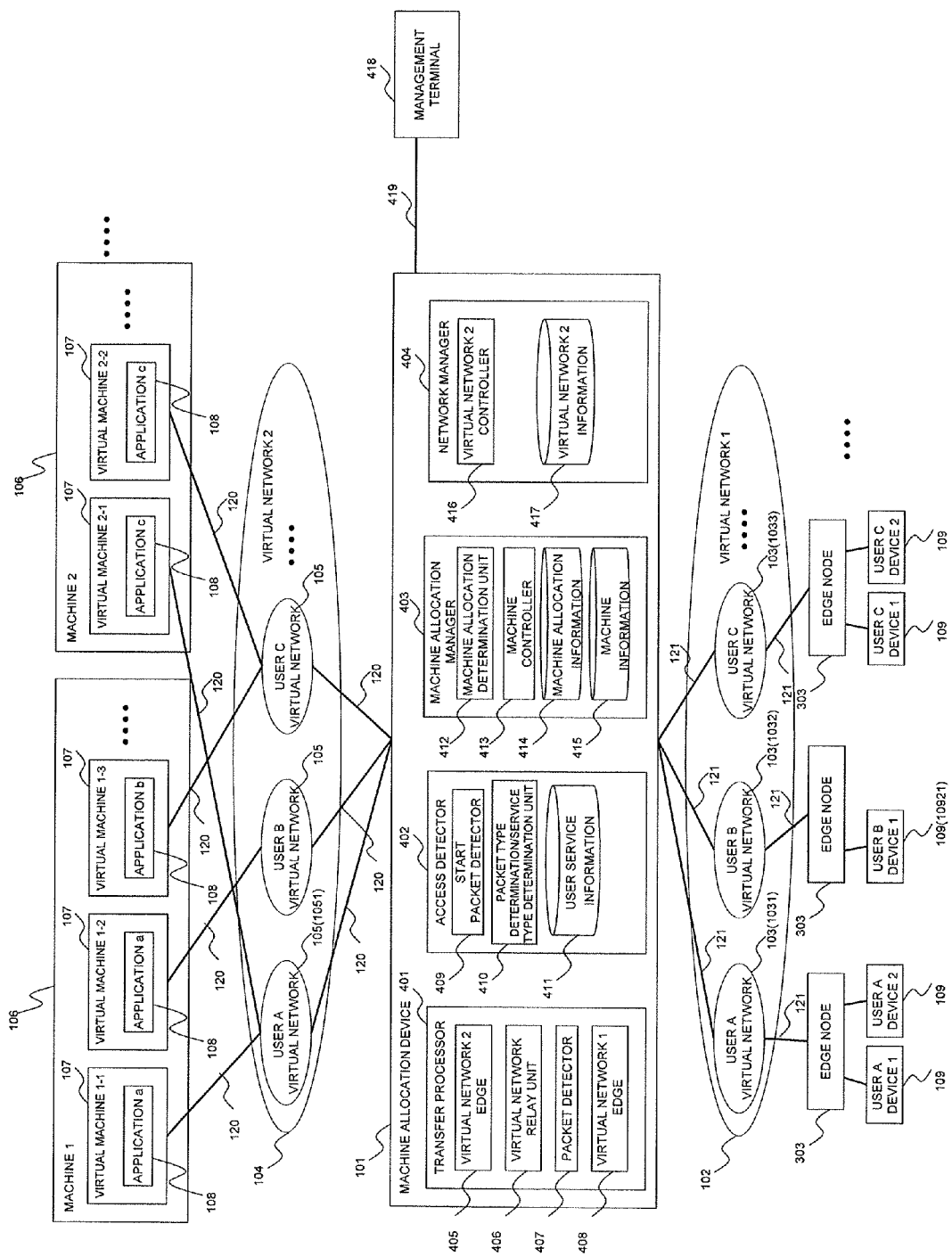
FIG. 4 is a block diagram illustrating a configuration of a machine allocation device according to the first embodiment.
Figure 5:
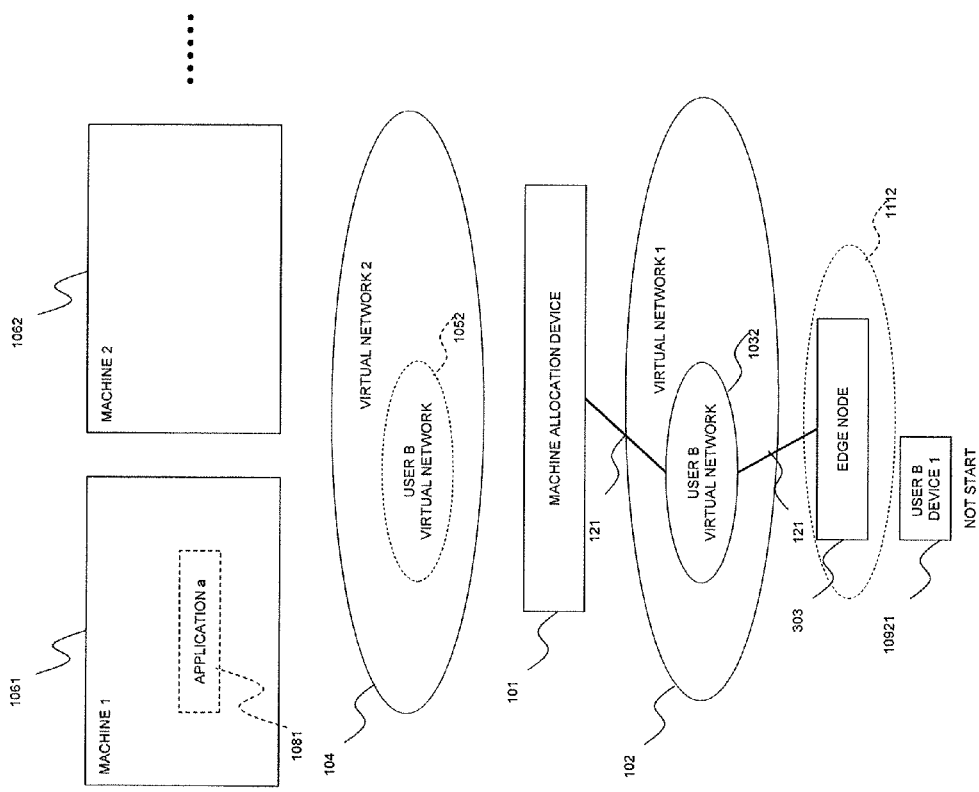
FIG. 5 is an illustrative view illustrating a system configuration before the user B starts to use the service according to the first embodiment.
Figure 6:
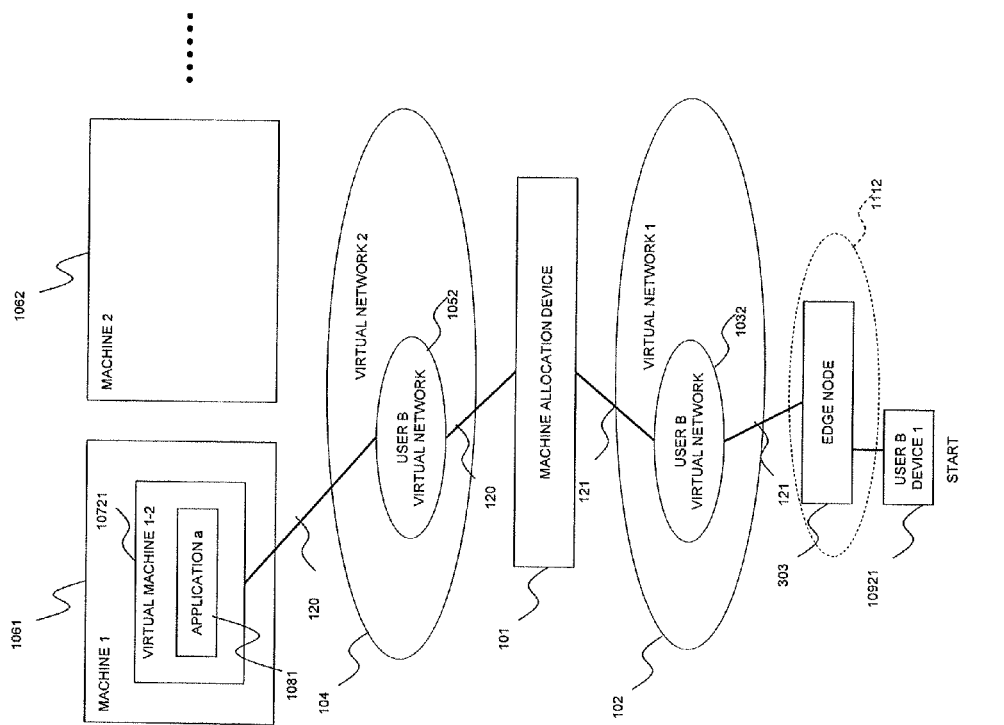
FIG. 6 is an illustrative view illustrating a system configuration after the user B starts to use the service according to the first embodiment.
Figure 7:
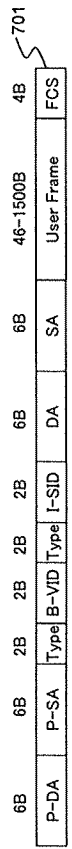
FIG. 7 is an illustrative view illustrating an example of a format of a communication packet of a virtual network 1 according to the first embodiment.
Figure 8:
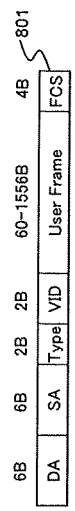
FIG. 8 is an illustrative view illustrating an example of a format of a communication packet of a virtual network 2 according to the first embodiment.

A detailed configuration of the machine allocation device 101 will be described with reference to FIGS. 4 to 12. FIG. 4 is a block diagram illustrating a configuration of a machine allocation device according to the first embodiment of the present invention. FIG. 5 is an illustrative view illustrating a system configuration before the user B starts to use the service according to the first embodiment of the present invention. FIG. 6 is an illustrative view illustrating a system configuration after the user B starts to use the service according to the first embodiment of the present invention. FIG. 7 is an illustrative view illustrating an example of a format of a communication packet of the virtual network 1 according to the first embodiment of the present invention. FIG. 8 is an illustrative view illustrating an example of a format of a communication packet of the virtual network 2 according to the first embodiment of the present invention. FIG. 9 is an illustrative view illustrating an example of user service information held by the machine allocation device according to the first embodiment of the present invention. FIG. 10 is an illustrative view illustrating an example of machine allocation information held by the machine allocation device according to the first embodiment of the present invention. FIG. 11 is an illustrative view illustrating an example of machine information held by the machine allocation device according to the first embodiment of the present invention. FIG. 12 is an illustrative view illustrating an example of information on the virtual network 2 held by the machine allocation device according to the first embodiment of the present invention. Each of the user service information, the machine allocation information, the machine information, the virtual network 2 information, and relay information is stored in an appropriate storage unit, and the storage unit may be provided anywhere.

First, a configuration of the machine allocation device 101 according to this embodiment will be described with reference to FIG. 4. As described above, the machine allocation device 101 is disposed between the virtual network (102) and the virtual network 2 (104), and connects the virtual network 103 for each user in the virtual network 1 (102) and the virtual network 105 for each user in the virtual network 2 (104). Also, a management terminal 418 for allowing a manager of the system to conduct an operation management of the machine allocation device 101 is connected to the machine allocation device 101 through a management network 419. As illustrated in FIG. 4, the machine allocation device 101 includes a transfer processor 401, an access detector 402, a machine allocation manager 403, and a network manager 404.

The transfer processor 401 has a virtual network 1 edge 408 that terminates the virtual network 1 (102), a virtual network 2 edge 405 that terminates the virtual network 2 (104), and a virtual network relay unit 406 that associates the virtual network 103 and the virtual network 105 for each user in the respective virtual networks with each other, as a function of transferring communication packets between those two virtual networks, that is, the virtual network 1 (102) and the virtual network 2 (104).

The virtual network relay unit 406 allows, for example, the communication packet of the user A to be transferred between a virtual network 1031 of the virtual network 1 (102) and a virtual network 1051 of the virtual network 2 (104). In this embodiment, as a method of configuring the virtual network 1 (102) and the virtual network 2 (104), for example, Provider Backbone Bridging (PBB) can be used for the virtual network 1 (102), and IEEE802.1Q (Virtual Bridged Local Area Networks) can be used for the virtual network 2 (104). In the following example, a case using those networks will be mainly described. However, the present invention can use appropriate standards, systems, and techniques without being limited to the above configuration.

FIG. 7 illustrates a format of the communication packet in the PBB. As illustrated in FIG. 7, in the PBB, a destination address (DA), a source address (SA), and a user frame, which are frames of the user, are encapsulated by Ethernet (registered trademark) frames to identify each user by any one or both of a backbone VLAN ID (B-VID) and a service instance ID (I-SID). The virtual network 1 edge 408 cancels the encapsulation of the communication packet of the PBB input from the virtual network 1 (102), and encapsulates the PBB of the communication packet output to the virtual network 1 (102).

Also, FIG. 8 illustrates a format of the communication packet in IEEE802.1Q. As illustrated in FIG. 8, in IEEE802.1Q, a VLAN ID (VID) tag is added to the frame of the user. Each user is identified by the VID. The virtual network 2 edge 405 cancels a VLAN tag of the communication packet such as IEEE802.1Q input from the virtual network 2 (104), and adds the VLAN tag of the communication packet output to the virtual network 2 (104).

The virtual network relay unit 406 holds a correspondence relationship between user identifiers B-VID and I-SID in the PBB and a user identifier VID in IEEE802.1Q for each user, and converts user identifier information for the communication packet to be transferred. Further, a packet detector 407 has a function of checking the frame of the communication packet to be transferred by a wire rate, detecting a packet having a specific data format, and holding the detected packet in a buffer. In this embodiment, the packet detector 407 detects a first communication packet transmitted to the application 108 in the data center 112 side by the user device 109 that starts in the home 110 side. For example, in the standard DLNA, the device that starts sends a discovery packet of a multicast as a protocol for detecting a device of a communication partner. Accordingly, the packet detector 407 has a function of detecting the communication packet of a specific IP address of the multicast. A transport technique used in the virtual network 1 (102) and the virtual network 2 (104) may be another technique other than the above technique if the VPN for each user can be configured.

The access detector 402 includes a start packet detector 409 that analyzes the frame of the communication packet detected by the packet detector 407, and determines a packet related to the start of the user device 109, and a packet type determination/service type determination unit 410 that determines a type of a start packet, and determines a type of the service required by the user device 109. The access detector 402 holds user service information 411 that is allocation information on the services provided to the users. As the types of the start packet, there are Universal Plug and Play (UPnP) used in the above-mentioned DLNA as well as a dynamic host configuration protocol (DHCP) which is a protocol for acquiring the IP address, a magic packet used in wake-on-LAN (WOL), and Jini and Bonjour which are bender specific standards. The types of the start packet may be standards other than the above standards or service specific protocols.

FIG. 9 illustrates the user service information 411 in a tabular form T901. The tabular form T901 includes a user identifier K901 for identifying the user in the service system, a physical port No. K902 of the machine allocation device 101 which is connected to the virtual network 103 for each user in the virtual network 1 (102), an identifier K903 for each user in the virtual network 1 (102), an identifier K904 of a unique service within the system as information of the service provided for the user, a service type K905, a service state K906 indicative of whether to start the service, or not, and an identifier K907 for each user in the virtual network 2 (104). In an example illustrated in FIG. 9, for example, the user A is A in the user identifier K901, 1/1 port in the physical port No. K902, and 100 in the identifier K903 of the virtual network 1031 for each user in the virtual network 1 (102). The identifier K903 for each user is an ID designated to the B-VID or I-SID of the communication packet of the above-mentioned PBB in FIG. 7. The types K905 of the services allocated to the user A are an application a (DLNA server), an application b (network attached storage (NAS)), and an application c. The identifiers K904 of the services corresponding to those services are 1-1, 2-1, and 3-1, and the service states K906 are active (operating), inactive (stopping), and active (operating). Also, the identifier K907 of the virtual network 1051 for each user in the virtual network 1 (102) for connection to the application that provides each service is 1 in both of the application a and the application c. The identifier K907 for each user is an ID designated to the VID of the above-mentioned communication packet such as IEEE802.1Q in FIG. 8. Referring to FIG. 9, the user identifier K901, the physical port No. K902, the identifier K903 for each user in the virtual network 1 (102), the identifier K904 of the service, and the type K905 of the service are set in a stage where the user contracts with the service, and set in advance in this embodiment. On the other hand, the service state K906 and the identifier K907 for each user in the virtual network 2 (104) are updated when the user starts the use of the service or terminates the use of the service. How to update will be described in detail in a machine allocation method that will be described later.

The machine allocation manager 403 includes a machine allocation determination unit 412 that determines on which machine 106 the application 108 operates when the application 108 that provides the service is newly allocated to the user, and a machine controller 413 that controls the machine on which the application 108 operates. The machine allocation manager 403 holds machine allocation information 414 that is information on the machine 106 allocated to the user, and machine information 415 that is list information on all of the machines 106 for providing the service to the user.

FIG. 10 illustrates the machine allocation information 414 in a tabular form T1001. The tabular form T1001 includes a physical machine identifier K1001 for identifying the machines 106, a virtual machine identifier K1002 for identifying the virtual machines 107 for operating the applications 108 that provide the services to the users, and an identifier K1003 of the service of the applications 108 that operate on the virtual machines 107.

FIG. 11 illustrates the machine allocation information 415 in a tabular form T1101. The tabular form T1101 includes a physical machine identifier K1101 for identifying the machines 106, a management IP address K1102 that manages the operation of the machines 106, an average load rate K1103 of central processing units (CPUs) of the machines 106, and an identifier K1104 of the virtual machines 107 that operate on the machines 106.

As described above, in this embodiment, each application 108 providing the service to the user is allowed to operate on the virtual machine 107. Referring to FIG. 10, the physical machine identifier K1001 is updated when adding or deleting the machine 106 with respect to the system, and predetermined in this embodiment. On the other hand, the virtual machine identifier K1002 and the identifier K1003 of the service are updated when the user starts the use of the service or terminates the use of the service. Also, referring to FIG. 11, the physical machine identifier K1101 and the management IP address K1102 are updated when adding or deleting the machine 106 with respect to the system, and predetermined in this embodiment. On the other hand, the identifier K1104 of the virtual machine 107 is updated when the user starts the use of the service or terminates the use of the service. How to update when the user starts the use of the service will be described in detail in the machine allocation method that will be described later.

The network manager 404 includes a virtual network 2 controller 416 that generates or deletes the virtual network 105 for each user which connects the machine allocation device 101 and each machine 106 on the virtual network 2 (104). The network manager 404 holds virtual network 2 information 417 that is configuration information on the switch 302 configuring the virtual network 2 (104) and the machine allocation device 101.

FIG. 12 illustrates the virtual network 2 information 417 in a tabular form T1201. The tabular form T1201 includes a node identifier K1201 of the switch 302 configuring the virtual network 2 (104) and the machine allocation device 101, a port No. K1202 of the node, a connection node identifier K1203 of the switch 302 and the machine allocation device 101 which are physically connected to the port, and VID K1204 such as IEEE802.1Q set for the port. Referring to FIG. 12, the node identifier K1201, the port No. K1202, and the connection node identifier K1203 are updated when adding or deleting the virtual network 2 (104) with respect to the switch 302, or changing the physical connection 310. The node identifier K1201, the port No. K1202, and the connection node identifier K1203 are set in advance in this embodiment. On the other hand, the VID K1204 such as IEEE802.1Q is updated when the user starts the use of the service or terminates the use of the service. How to update will be described in detail in the machine allocation method that will be described later.

With the above configuration, the machine allocation device 101 efficiently allocates the machines 106 on which the applications 108 providing the services to the users operate. For example, in a case where the user device 10921 of the user B starts, if the user device 10921 is stopping or disconnected to the home network 1112, as illustrated in FIG. 5, the application 1081 providing the service to the user B does not start, and it is not determined on which machine 106 (1061 or 1062) the application 1081 operates. Also, in the network of the user B, only the virtual network 1032 is configured in the virtual network 1 (102), and a virtual network 1052 is not configured in the virtual network 2 (104). This is because the machine 106 on which the application 1081 operates is not determined in this stage. On the other hand, when the user device 10921 of the user B starts and is using the service of the application 1081, the network is configured as illustrated in FIG. 6. The virtual machine 10721 on which the application 1081 operates on the machine 1061, and the virtual network 1052 is configured in the virtual network 2 (104) as a network for connecting the machine 1061 and the machine allocation device 101. In an example of FIG. 6, the application 1081 operates on the machine 1061, but may operate on another machine 1062 by allocation of the machine by the machine allocation determination unit 412.

3. Machine Allocation Method

Figure 13:
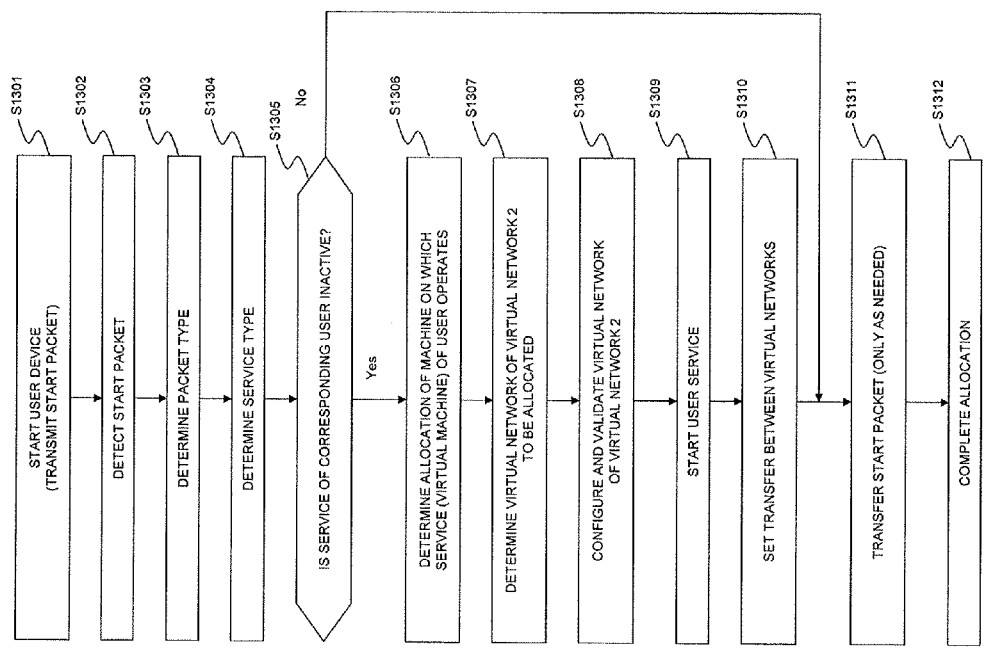
FIG. 13 is a flowchart illustrating an example of an allocation method of a machine when a user device starts according to the first embodiment.
Figure 14:
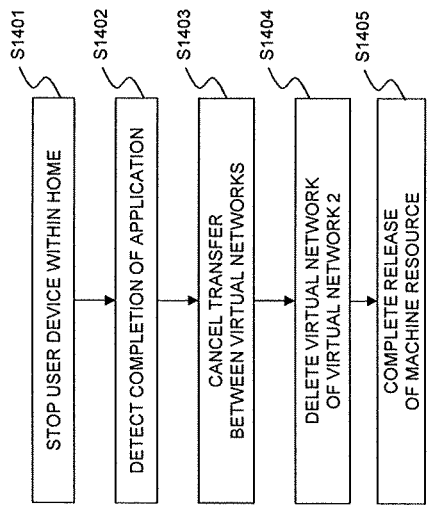
FIG. 14 is a flowchart illustrating an example of a resource release method of the machine and the virtual network when the user terminates the use of an application according to the first embodiment.
Figure 16:
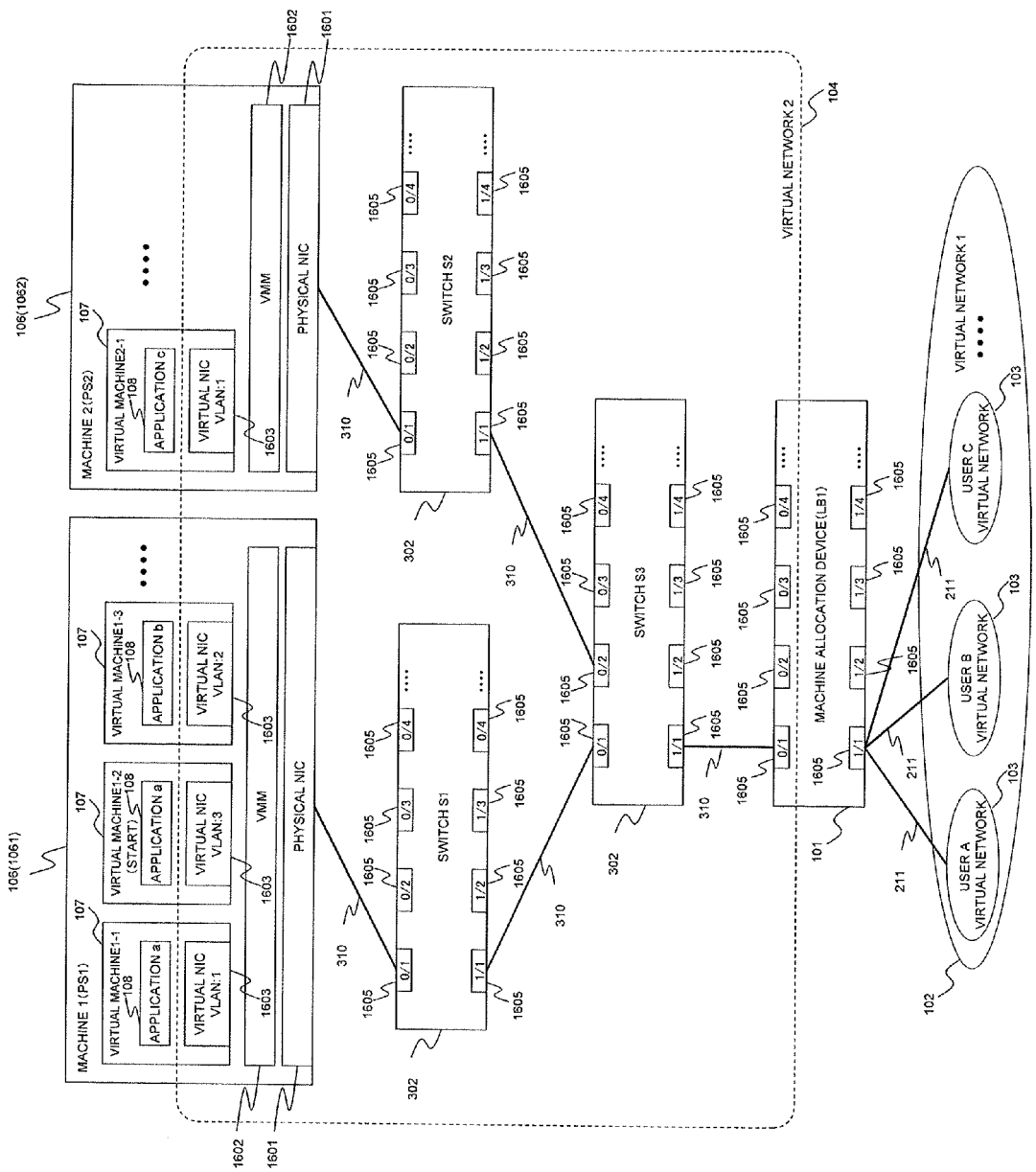
FIG. 16 is an illustrative view illustrating an example of a physical network topology of the virtual network 2 according to the first embodiment.
Figure 18:
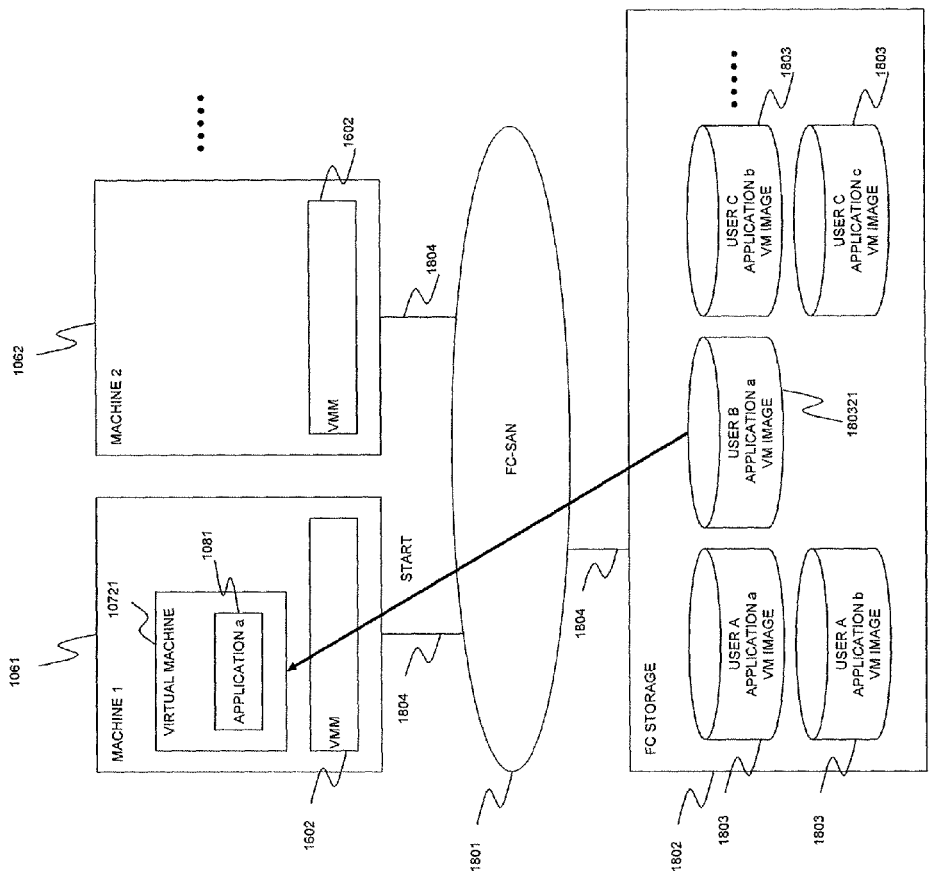
FIG. 18 is an illustrative view illustrating one example of a method of starting a virtual machine according to the first embodiment.
Figure 19:
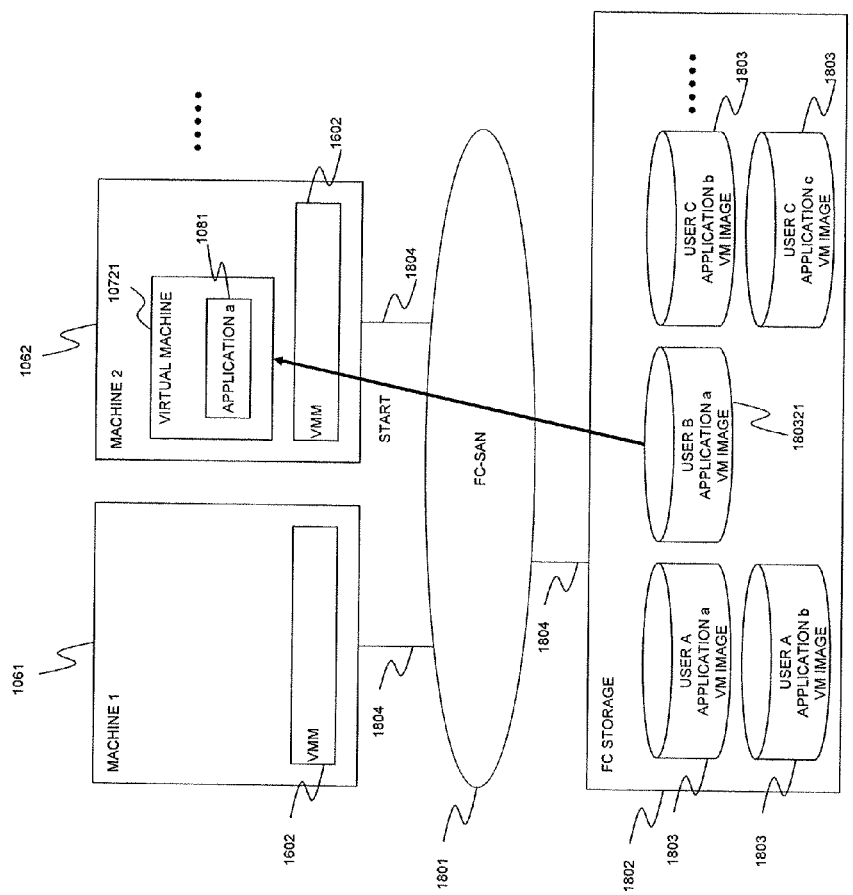
FIG. 19 is an illustrative view illustrating another example of the method of starting the virtual machine according to the first embodiment.

Subsequently, a method in which the machine allocation device 101 allocates the machines as illustrated in FIGS. 5 and 6 before and after the user device 109 starts will be described with reference to FIGS. 13 to 19, 39 to 41, and 45. FIG. 13 is a flowchart illustrating an example of the machine allocation method when the user device starts according to the first embodiment of the present invention. FIG. 14 is a flowchart illustrating an example of a resource release method of the machine and the virtual network when the user terminates the use of the application according to the first embodiment of the present invention. FIG. 15 is an illustrative view illustrating an example of a format of a start packet according to the first embodiment of the present invention. FIG. 16 is an illustrative view illustrating an example of a physical network topology of the virtual network 2 according to the first embodiment of the present invention. FIG. 17 is an illustrative view illustrating an example of relay information between the virtual networks according to the first embodiment of the present invention. FIGS. 18 and 19 are illustrative views illustrating examples of a method of starting the virtual machine according to the first embodiment of the present invention. FIG. 39 is an illustrative view illustrating an example of information on the virtual network 2 (after updated) held by the machine allocation device according to the first embodiment of the present invention. FIG. 40 is an illustrative view illustrating an example of the relay information (after updated) between the virtual networks according to the first embodiment of the present invention. FIG. 41 is an illustrative view illustrating an example of user service information (after updated) held by the machine allocation device according to the first embodiment of the present invention. FIG. 45 is an illustrative view illustrating an example of the machine allocation information (after updated) held by the machine allocation device according to the first embodiment of the present invention.

First, a description will be given of a method of allocating the machines 106 on which the applications 108 operate when the user devices 109 start with reference to FIG. 13. As a specific example, a description will be given of a case in which the user device 10921 (TV) of the user B illustrated in FIGS. 5 and 6 as described above starts, and receives the service of the application a (DLNA server) 1081.

(Step S1301)

First, the user device 109 within the home 110 of the user starts when turning on a power supply, returning from a sleep state, or connecting to the home network 111. When the user device 109 starts, a communication packet for accessing to the application 108 to be used, that is, a so-called start packet is sent from the user device 109. In a specific example of the user B, Discovery using the UPnP is conducted according to a protocol of the standards DLNA, and an advertisement packet 1501 illustrated in FIG. 15 is sent as the start packet. As illustrated in FIG. 15, the advertisement packet 1501 is sent to a destination IP address 239.255.255.250 as multicast, and arrives at the machine allocation device 101 through the virtual network 1032 of the user B (Step S1301). For example, when the virtual network 1 (102) configures the virtual networks 1031, 1032, and 1033 in the format of the PBB illustrated in FIG. 7, in the start packet within the virtual network 1032 of the user B includes data in FIG. 15, a user frame portion of FIG. 7 has data of FIG. 15.

(Step S1302)

Subsequently, the packet detector 407 of the machine allocation device 101 detects the start packet sent from the user device 109, and notifies the access detector 402 of the detected start packet. In the specific example of the user B, the packet detector 407 checks the packet header, and extracts the start packet (for example, advertisement packet) In this example, the packet detector 407 conducts a process of extracting the communication packet that matches the IP address 239.255.255.250 of the advertisement packet 1501. The extracted communication packet is delivered to the access detector 402, for example, through a buffer memory within the machine allocation device 101 (Step S1302).

(Step S1303)

Then, in the access detector 402 of the machine allocation device 101, the start packet detector 409 analyzes communication packet data extracted by the packet detector 407, and selects only the communication packet that matches the start packet. The packet type determination/service type determination unit 410 analyzes information on the communication packet, and determines the type of the start packet. The types of the start packet are UPnP, DHCP, WOL, Jini, Bonjour, and a unique protocol as described above. In the specific example of the user B, the start packet detector 409 extracts data related to the start packet from the communication packet data held on the buffer memory. The packet type determination/service type determination unit 410 analyzes data of the advertisement packet 1501 in FIG. 15, and, for example, detects data "HOST:239.255.255.250:1900" of HTTPMU, and determines the data as the advertisement packet of the UPnP (Step S1303).

(Step S1304)

Subsequently, the packet type determination/service type determination unit 410 analyzes the information on the communication packet, and determines the type of the service required by the user device 109. In the specific example of the user B, the packet type determination/service type determination unit 410 analyzes the data of the advertisement packet 1501 in FIG. 15, and, for example, detects data of "ST: urn; schemas-upnp-org: device: MediaServer: 1" of the HTTPMU, and determines that MediaServer: 1 level of the standards DLNA, that is, the service (application a (DLNA server)) of the DLNA server which delivers the content is required (Step S1304).

(Step S1305)

Then, the packet type determination/service type determination unit 410 refers to the service state K906 of the user service information 411, and checks whether the application 108 providing the service determined in Step S1304 is inactive (stopping), or not. Which user transmits the start packet is provided by extracting the virtual network 1 identifier of the communication packet including the start packet in the virtual network 1 edge 408. For example, the B-VID or I-SID in FIG. 7 corresponds to the virtual network 1 identifier. In the specific example of the user B, the virtual network 1 identifier is extracted, and the type of the service is proved as the service of the DLNA server (in this example, application a (DLNA server)) in the determination of Step S1304. Therefore, referring to a line corresponding to the DLNA server of the information on the user B in the user service information 411 illustrated in FIG. 9 corresponding to the determined service, it is found that the identifier K904 of the service is 1-2, the state K906 of the service is inactive (stopping), and the identifier K907 of the virtual network 2 (104) is NA, that is, non-allocated. In this stage, the virtual network 105 is not allocated to the virtual network 2 (104) for the user and service (Step S1305).

(Step S1306)

If the application 108 corresponding to the start packet is inactive (stopping) in the determination of Step S1305, the packet type determination/service type determination unit 410 notifies the machine allocation manager 403 of information necessary to newly start the application 108 such as the user identifier, the type of service, and the virtual network 2 identifier. The information necessary to newly start the application 108 may appropriately include the identifier of the virtual network 1, the service identifier, or the port No. The machine allocation determination unit 412 determines the machine 106 on which the application 108 newly operates, based on the above information and with reference to the machine information 415. This embodiment employs a method in which the average load rate K1103 of the CPU for each machine in the machine information 415 illustrated in FIG. 11 is compared with each other, and for example, the machine 106 small in the average load rate K1103 is selected. The method of selecting the machine is not limited to this method, but may be other methods such as a round-robin method of allocating the machines in order, a method of minimizing the number of machines 106 on which the applications operate, or a method of allocating the machines for each service. In the specific example of the user B, the average load rate K1103 of the CPU for each machine in the machine information 415 illustrated in FIG. 11 is 15% in the machine 1061 (PS1), and 20% in the machine 1062 (PS2). The machine 1061 (PS1) smaller in the average load rate K1103 is selected (Step S1306).

FIG. 45 illustrates the updated machine allocation information 414. In the specific example of the user B, the machine 1061 (PS1) is selected as described above. Further, referring to the machine information 415 or the machine allocation information 414, the machine allocation determination unit 412 determines an unused virtual machine ID since operating virtual machine IDs are 1-1 and 1-3 in the machine 1061 (PS1). In this example, for example, the virtual machine ID is set to 1-2. Also, since the allocation service ID previously obtained is 1-2, an entry setting the virtual machine ID K1002 to 1-2 and the allocation service ID K1003 to 1-2 is added to a corresponding line of the machine IDK1001 PS1.

(Step S1307)

Subsequently, the virtual network 2 controller 416 of the network manager 404 generates the network configuration information on the virtual network 105 of the user requesting the service between the machine 106 selected in Step S1306 and the machine allocation device 101. In this embodiment, since the virtual network 2 (104) configures the virtual network 105 for each user by IEEE802.1Q, the virtual network 2 controller 416 generates the network configuration information for adding VIDs to the physical ports of the switch 302 configuring the virtual network 2 (104) and the machine allocation device 101. In the specific example of the user B, the virtual network 2 controller 416 configures the virtual network 1052 between the machine 1061 (PS1) determined in Step S1306 and the machine allocation device 101.

FIG. 16 illustrates a physical network topology of the virtual network 2 (104) configured by the virtual network 2 information 417 in FIG. 12. In FIG. 16, reference numeral 1601 denotes physical network interface cards (NICs), reference numeral 1602 is virtual machine monitors (VMMs) that provide virtual machine functions, reference numeral 1603 is virtual network interface cards (NICs) allocated to the virtual machines 107 provided by the VMMs (1602), and reference numeral 1605 is physical ports of the switches 302 and the machine allocation device 101, which are connected with the machines 106, the switches 302, and the machine allocation device 101 in the topology illustrated in FIG. 16. In FIG. 16, the home 110 side of the virtual network 1 (102) is omitted. In order to configure the virtual networks 1052 between the machines 1061 (PS1) and the machine allocation device 101, referring to the virtual network 2 information 417 in FIG. 12, the non-allocated VID, for example, VID: 3 is selected to generate the network configuration information for configuring the network configuration among the machine 1061 (PS1), the virtual network 2 (104), and the machine allocation device 101. In this example, the network configuration information configuring VID: 3 is generated in ports 0/1 and 1/1 of the switch 302 (S1) of the virtual network 2 (104), ports 0/1 and 1/1 of the switch 302 (S3) of the virtual network 2 (104), and a port 0/1 of the machine allocation device 101 (Step S1307).

(Step S1308)

Then, the virtual network 2 controller 416 sets the network configuration for the switch 302 and the machine allocation device 101 on the basis of the network configuration information generated in S1307, validates the set network configuration, and updates the virtual network 2 information 417. In the specific example of the user B, the network configuration information generated in S1307, that is, VID: 3 is set in the ports 0/1 and 1/1 of the switch 302 (S1) of the virtual network 2 (104), the ports 0/1 and 1/1 of the switch 302 (S3) of the virtual network 2 (104), and the port 0/1 of the machine allocation device 101 for each device, and validated. Also, the entry of VID: 3 is added to the VID (K1204) of the virtual network 2 information 417, and updated. FIG. 39 illustrates the virtual network 2 information 417 in which the information on VID: 3 is updated (Step S1308).

(Step S1309)

Then, the machine controller 413 starts the virtual machine 107 in the machine 106 determined in Step S1306, and also starts the application 108 under the control. Also, the machine controller 413 updates the information on the started virtual machine 107 in the user service information 411, the machine allocation information 414, and the machine information 415.

In the specific example of the user B, a mechanism in which the virtual machine 107 on which the application 108 operates can be started by any machine 106 will be described with reference to FIGS. 18 and 19. In this embodiment, as illustrated in FIG. 18, the virtual machine 107 in which a fibre channel (FC) storage 1802 is shared between the machines 1061 and 1062 to operate the application 108 can be started by any one of the machines 1061 and 1062. As illustrated in FIG. 18, the machines 1061, 1062 and the FC storage 1802 are connected by a fibre channel-storage area network (FC-SAN). In this example, reference numeral 1804 is a logical connection of the FC. The FC storage 1802 holds a virtual machine (VM) image 1803, that is, 180321 for each application 108 of each user therein. As illustrated in FIG. 18, in order to start the application a (1081) of the user B on the machine 1061, the virtual machine 10721 is started on the machine 1061 by the application a VM image 180321 of the user B due to an FC boot. On the other hand, as illustrated in FIG. 19, in order to start the application a (1081) of the user B on the machine 1062, the virtual machine 10721 is started on the machine 1061 by the application a VM image 180321 of the user B due to the FC boot. As specific methods of starting the virtual machine 107, there are a method using wake-on-LAN (WOL), and a method using a management message with the use of a management software of the virtual machine 107. As the storage used by the virtual machine 107, a network storage and a local storage within the machine 106 are conceivable other than the FC storage 1082 described in this embodiment. For that reason, the storage is omitted in FIGS. 1 and 4 (Step S1309).

(Step S1310)

Then, the virtual network relay unit 406 is configured to transfer the communication packet of the user between the virtual network 1 (102) and the virtual network 2 (104)

FIG. 17 illustrates the relay information between the networks which is held by the transfer processor 401 in a tabular form T1701. The tabular form T1701 includes a port No. K1701 and an identifier K1702 of the machine allocation device connected with the virtual network 103, as information on the virtual network 1 (102) side, and a port No. K1703 and an identifier K1704 of the machine allocation device connected with the corresponding virtual network 105, as information on the virtual network 2 (104) side. For example, the virtual network 103 in which the identifier K1702 on the virtual network 1 (102) side is 100 finds that the identifier K1704 on the virtual network 2 (104) side is 1. In the specific example of the user B, since the identifier K1702 on the virtual network 1 (102) side of the user B is 200, the port No. K1703 is set to 0/1, and the identifier K1704 is set to VID:3 set in Step S1308 on a corresponding line of T1701 as setting on the virtual network 2 (104) side.

FIG. 40 illustrates the relay information between the networks in which the information on VID:3 is updated.

Also, FIG. 41 illustrates the user service information 411 in which the information on the application a (DLNA server) of the user B is updated (Step S1310). In the specific example of the user B, the service state K906 is set to active, and the virtual network 2 identifier K907 is set to VID:3 set in Step S1308 on a corresponding line on which the identifier K903 on the virtual network 1 (102) side of the user B is 200, the service ID K904 is 1-2, and the service type K905 is the application a (DLNA server) 2.
(Step S1311)

Then, the packet detector 407 transfers the start packet held in the buffer memory to the virtual network 2 (104) side. This is because when there is no reply in a protocol for sending the start packet, and time is out, an error is prevented from occurring due to no process of retrying the packet sending. If the retrying process is conducted in the protocol, there is no need to transfer the start packet (Step S1311).

On the other hand, if the application 108 corresponding to the start packet is active (operating) in the determination of Step S1305, since there is no need to newly allocate the machine 106, processing after Step S1311 is conducted.
(Step S1312)

With the above processing, the allocation process of the machine allocation device 101 is completed (Step S1312).

4. Resource Release Method

Subsequently, a description will be given of a method of releasing resources of the machine 106 and the virtual network 105 when terminating the use of the application 108 with reference to FIG. 14. First, the user device 109 within the home 110 of the user turns off power, transits to a sleeve state, and stops due to disconnection from the home network 111. With this operation, the application 108 that provides the service on the data center 112 side detects the stop of the user device 109, and completes the application (Step S1401). Then, the machine controller 413 detects the completion of the application 108 through a notification from the application 108. In this embodiment, the machine controller 413 shuts down the virtual machine 107 on which the application 108 has been completed. Also, the machine controller 413 updates or deletes an entry of the user service information 411, the machine allocation information 414, and the machine information 415 to the completed application 108 (Step S1402). Then, the virtual network relay unit 406 cancels the transfer of the communication packet of the user between the virtual network 1 (102) and the virtual network 2 (104). That is, the virtual network relay unit 406 updates the information on the corresponding virtual network 2 (104) side from the relay information between the networks which are held by the transfer processor 401 illustrated in FIG. 17 (Step S1403). Then, the virtual network 2 controller 416 deletes the virtual network 105 between the machine 106 on which the completed application 108 has operated and the machine allocation device 101. Also, the virtual network 2 controller 416 updates or deletes an entry related to the virtual network 105 in which the user service information 411 and the virtual network 2 information 417 have been deleted (Step S1404). With the above operation, the process of releasing the resource in the machine allocation device 101 is completed (Step S1405). In Steps S1403 and S1404, when another application other than the application 108 completed by the user is used, setting requiring no deletion of the virtual network 105 is not conducted.

As described above, in the first embodiment of the present invention, the machine 106 on which the application 108 providing the service operates is dynamically allocated to the user within the data center 112 when starting the user device 109 on the home side. Also, the virtual network 105 of the user is dynamically configured between the machine 106 dynamically allocated and the machine allocation device 101, thereby enabling the machine 106 to be freely allocated to plural users. As a result, the use efficiency of the machine 106 can be enhanced.

B. Second Embodiment

IPsec, Virtual Network 2

Figure 20:
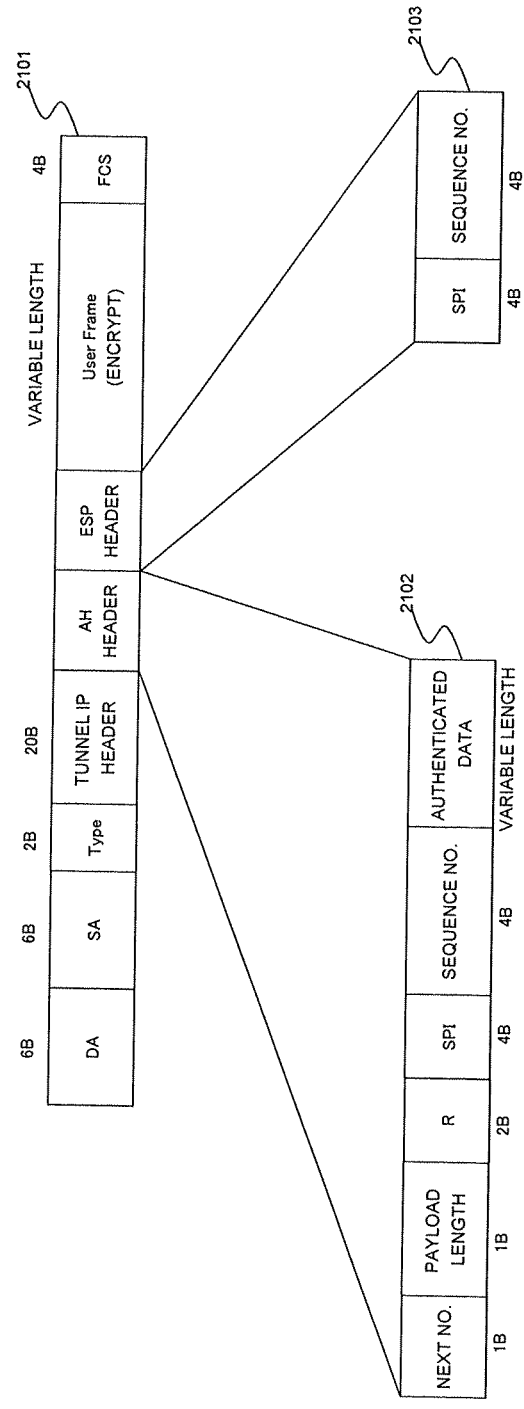
FIG. 20 is an illustrative view illustrating an example of a format of a communication packet of a virtual network 2 according to a second embodiment.
Figure 22:
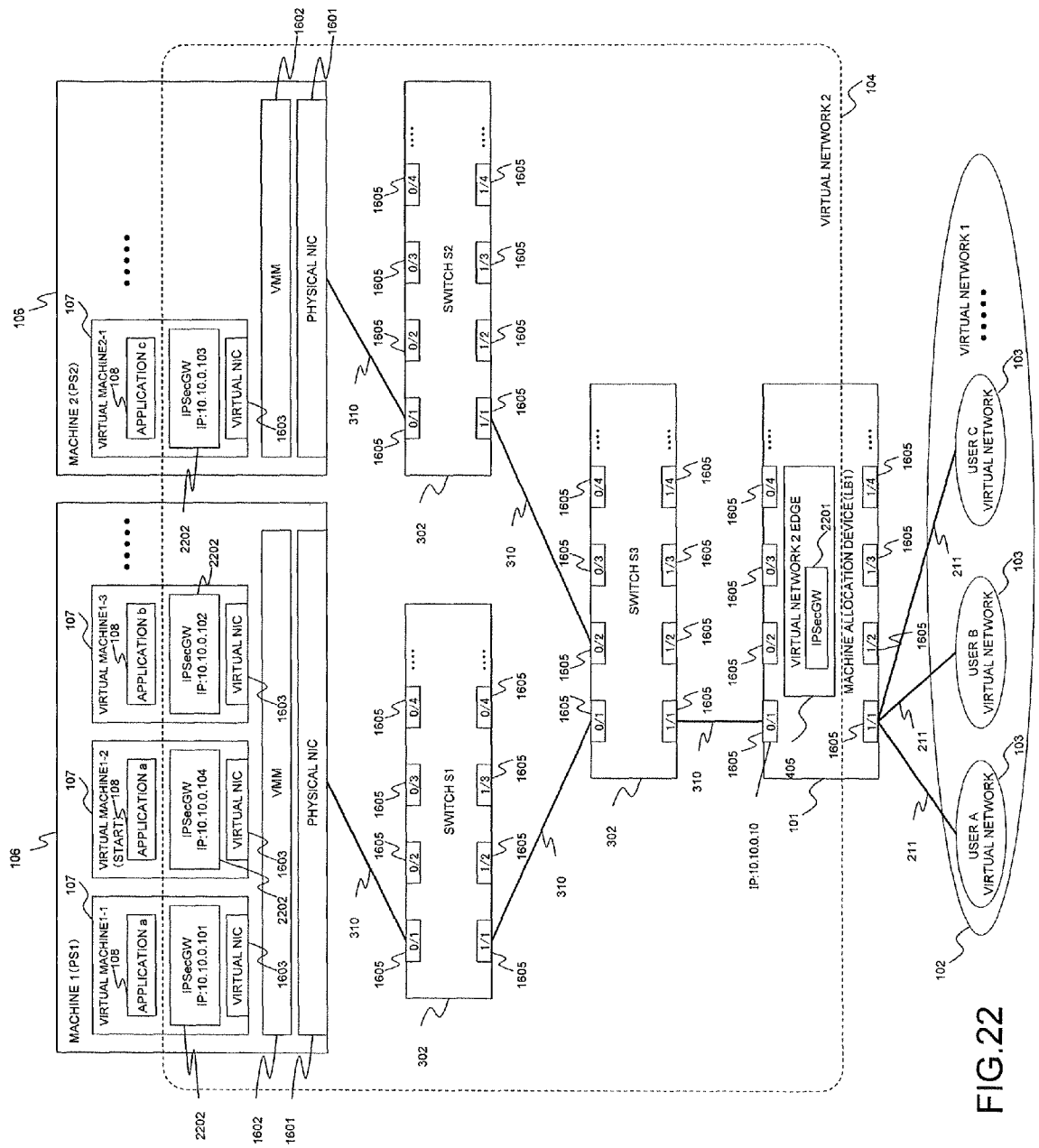
FIG. 22 is an illustrative view illustrating an example of a physical network topology of the virtual network 2 according to the second embodiment.

Subsequently, a description will be given of a system using a machine allocation device according to a second embodiment of the present invention. This embodiment is identical with the system using the machine allocation device according to the first embodiment except that the method of configuring the virtual network 2 (104) is different. Accordingly, only different portions from those in the first embodiment will be described below, and the same portions will be omitted from the description. A description will be given of a configuration of the machine allocation device 101 and a method of allocating the machine with reference to FIGS. 20 to 23, 42, 43, and 46. FIG. 20 is an illustrative view illustrating an example of a format of a communication packet of a virtual network 2 according to a second embodiment of the present invention. FIG. 21 is an illustrative view illustrating an example of virtual network 2 information held by the machine allocation device according to the second embodiment of the present invention. FIG. 22 is an illustrative view illustrating an example of a physical network topology of the virtual network 2 according to the second embodiment of the present invention. FIG. 23 is an illustrative view illustrating an example of relay information between the virtual networks according to the second embodiment of the present invention. FIG. 42 is an illustrative view illustrating an example of the virtual network 2 information (after updated) held by the machine allocation device according to the second embodiment of the present invention. FIG. 43 is an illustrative view illustrating an example of the relay information (after updated) between the virtual networks according to the second embodiment of the present invention. FIG. 46 is an illustrative view illustrating an example of user service information held by the machine allocation device according to the second embodiment of the present invention. FIG. 47 is an illustrative view illustrating an example of the user service information (after updated) held by the machine allocation device according to the second embodiment of the present invention. The method of configuring the virtual network 2 (104) according to the first embodiment uses IEEE802.1Q. On the other hand, this embodiment can use a tunnel mode of a security architecture for internet protocol (IPsec) illustrated in FIG. 20. In the following example, a case mainly using the tunnel mode of the IPsec will be described. However, the present invention is not limited to this configuration, but can use appropriate standards, systems, and techniques.

As illustrated in FIG. 20, in the tunnel mode of the IPsec, the packet of the user is encrypted and encapsulated by a tunnel IP header. The packet is transferred between a source and a destination by the tunnel IP header, thereby enabling the virtual network 105 for each user to be configured. That is, a tunnel using the IPsec is configured between the machine 106 and the machine allocation device 101. The IP address or a security parameter index (SPI) on the machine 106 side is used for identification of each user. Accordingly, in this embodiment, the network manager 404 conducts a configuration management of not IEEE802.1Q of the first embodiment but the IPsec, as a network management of the virtual network 2.

FIG. 46 illustrates the user service information 411 in a tabular form T901. The tabular form T901 includes the user identifier K901, the physical port No. K902, the identifier K903 for each user in the virtual network 1 (102), the identifier K904 of a unique service within the system, the type K905 of the service, and the service state K906 as in FIG. 9. Also, instead of the identifier K907 for each user in the virtual network 2 (104) in FIG. 9, the tabular form T901 includes, as configuration information on the virtual network 2, an IP address K2105 that terminates the tunnel of the IPsec on the machine 106 side, an SPI (K2106) on a transmitter side, and an SPI (K2107) on a receiver side. Since the identifier of the virtual network 2 may be unique, at least any one of the IP address K2105, the SPI (K2106) on the transmitter side, and the SPI (K2107) on the receiver side may be provided.

FIG. 21 illustrates the virtual network 2 information 417 held by the network manager 404 in a tabular form T2101. The tabular form T2101 includes an identifier K2101 of the service provided to the user, an identifier K2102 of the machine allocation device 101, a port No. K2103 of the machine allocation device 101 connecting the virtual network 105, and an IP address K2104 terminating the tunnel of the IPsec on the machine allocation device side as configuration information on the machine allocation device 101, and the IP address K2105 terminating the tunnel of the IPsec on the machine 106 side, the SPI (K2106) on the transmitter side, and the SPI (K2107) on the receiver side as the configuration information on the virtual network 2. The virtual network 2 information 417 in FIG. 21 is dynamically created when the user starts the use of the service (Step S1308).

The machine allocation method according to this embodiment is different from the machine allocation method according to the first embodiment illustrated in FIG. 13 in that a process of generating the tunnel of the IPsec is conducted in Steps S1307, 1308, S1309, and S1310 for generating the virtual network 105 for each user between the machine 106 and the machine allocation device 101.

FIG. 22 illustrates a physical network topology of the virtual network 2 (104) configured by the virtual network 2 information 417 in FIG. 21. As illustrated in FIG. 22, in this embodiment, a gateway (GW) 2201 of the IPsec is installed in the virtual network 2 edge 405 of the machine allocation device 101. Also, a GW (2202) of the Ipsec is installed within the virtual machine 107. The tunnel of the IPsec is configured between the GWs (2201, 2202) of the IPsec, thereby configuring the virtual network 105 for each user. In FIG. 22, the home 110 side of the virtual network 1 (102) is omitted.

In a specific example in which the user B uses the service of the application 108, the following processing is executed.
(Step S1307)

In Step S1307, configuration information (for example, IP address and SPI information) on an unused virtual network 2 is confirmed with the use of the virtual network 2 information 417 illustrated in FIG. 21. Network configuration information configuring the tunnel of the IPsec between the machine allocation device (LB1) 101 and the virtual machine 1-2 (107) in FIG. 22 is generated. In an example of FIG. 22, when the service ID (K2101) is 1-2, the identifier K2102 of the machine allocation device 101 is LB1, the port No. K2103 is 0/1, and the IP address K2104 of the port is 10.10.0.10, it is determined as the respective unused information that the IP address K2105 of the virtual network 2 is 10.10.0.104, the SPI (transmission) K2106 is 0x00000103, and the SPI (reception) K2107 is 0x0001004.
(Step S1308)

Then, in Step S1308, the virtual network 2 controller 416 configures the networks in the machine 106 and the machine allocation device 101 on the basis of the network configuration information generated, in step S1307 and validates the configured networks, and updates the virtual network 2 information 417.

In configuration of the machine 106 and the machine allocation device 101, for the GW2201 and GW2202 of the IPSec, the IP address K2105, the SPI K2106, and the SPI K2107 are set with respect to the service ID (K2101), the identifier K2102 of the machine allocation device 101, the port No. K2103, and the IP address K2104 of the port.

FIG. 42 illustrates the virtual network 2 information 417 in which information related to 1-2 of the service ID (K2101) is updated.
(Step S1309)

Subsequently, the machine controller 413 starts the virtual machine 107 in the machine 106 determined in Step S1306, and also starts the application 108 under the control. Also, the machine controller 413 updates information on the started virtual machine 107 in the user service information 411, the machine allocation information 414, and the machine information 415.

Also, FIG. 47 illustrates the user service information 411 in which information on the application a (DLNA server) of the user B is updated (Step S1310). In the specific example of the user B, on a corresponding line in which the identifier K903 on the virtual network 1 (102) side of the user B is 200, the service ID K904 is 1-2, and the service type K905 is the application a (DLNA server) 2, the service state K906 is active, and instead of the virtual network 2 identifier of FIG. 9, the IP address K2105 of the virtual network 2 is set to 10.10.0.104, the SPI (transmission) K2106 is set to 0x00000103, and the SPI (reception) K2107 is set to 0x0001004.
(Step S1310)

Also, in Step S1310, the virtual network relay unit 406 is configured to transfer the communication packet of the user between the virtual network 1 (102) and the virtual network 2 (104) due to the relay information between the networks illustrated in FIG. 23.

FIG. 23 illustrates the relay information between the networks which is held by the transfer processor 401 in a tabular form T2301. The tabular form T2301 includes the port No. K1701 of the machine allocation device connected with the virtual network 103, the identifier K1702, and a media access control (MAC) address K2301 held by the user device 109 as information on the virtual network 1 (102) side, and the port No. K1703 of the machine allocation device connected with the corresponding virtual network 105, and an IP address K2302 on the application 108 side of the IPsec as an identifier as the information on the virtual network 2 (104) side. In this example, the reason why the media access control (MAC) address K2301 is used is that when the tunnel is used as in this embodiment, if one user uses plural applications 108, the tunnel of point-two-point (P2P) is configured for each application 108 on the virtual network 2 (104) side, resulting in a need to determine to which tunnel the communication packet is transferred in the machine allocation device 101. In this embodiment, the media access control (MAC) address K2301 is used for allocation to the application 108. Since only the allocation to the application 108 is needed, another information may be used.

FIG. 43 illustrates the relay information between the networks in which the information on the user B is updated.

C. Third Embodiment

IPsec, Virtual Network 1

Figure 25:
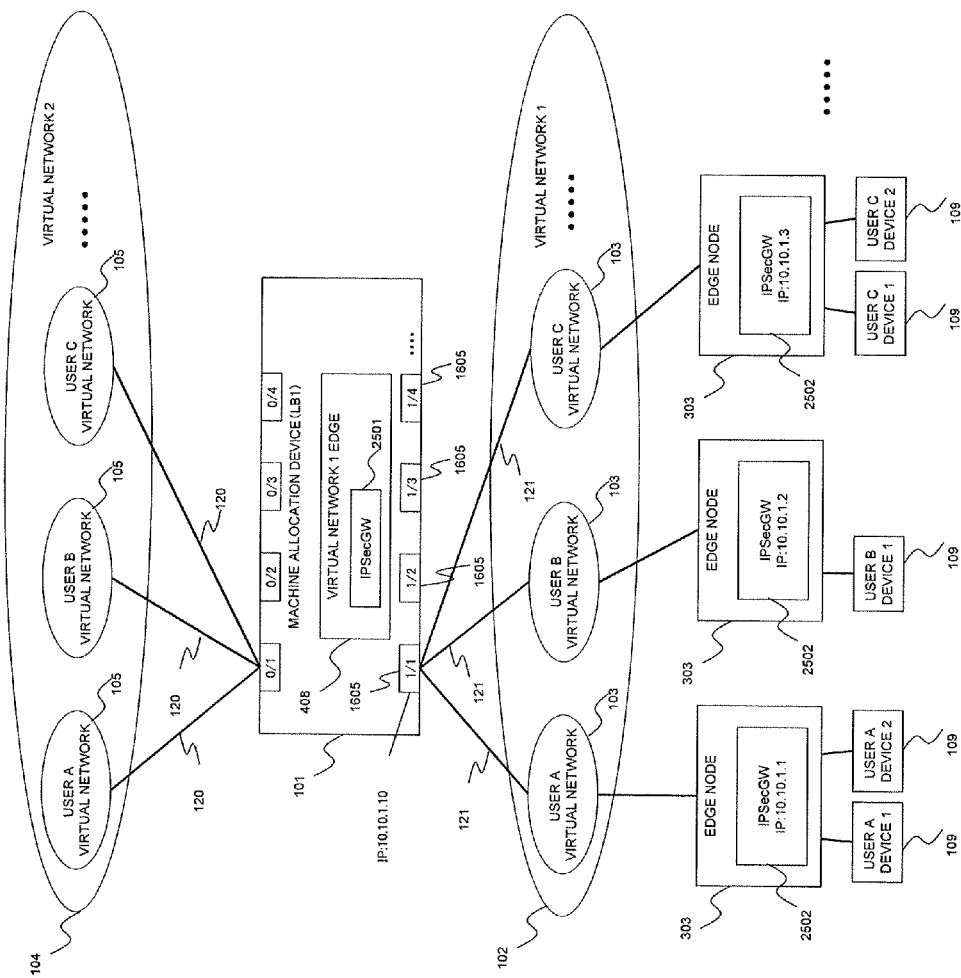
FIG. 25 is an illustrative view illustrating an example of the configuration of a virtual network 1 according to the third embodiment.
Figure 44:
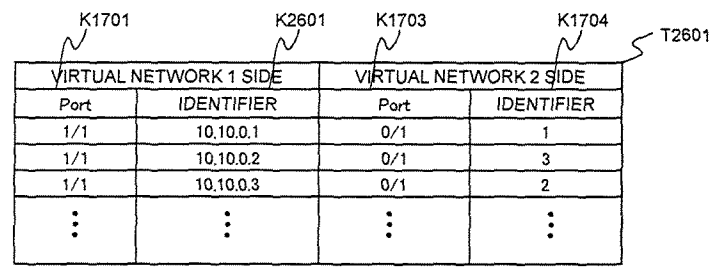

Subsequently, a description will be given of a system using a machine allocation device according to a third embodiment of the present invention. This embodiment is identical with the system using the machine allocation device according to the first embodiment except that the method of configuring the virtual network 1 (102) is different. Accordingly, only different portions from those in the first embodiment will be described below, and the same portions will be omitted from the description. A description will be given of a configuration of the machine allocation device 101 and a method of allocating the machine with reference to FIGS. 24 to 26 and 44. FIG. 24 is an illustrative view illustrating an example of user service information held by the machine allocation device according to the third embodiment of the present invention. FIG. 25 is an illustrative view illustrating an example of the configuration of the virtual network 1 according to the third embodiment of the present invention. FIG. 26 is an illustrative view illustrating an example of relay information between the virtual networks according to the third embodiment of the present invention. FIG. 44 is an illustrative view illustrating an example of the relay information (after updated) between the virtual networks according to the third embodiment of the present invention.

The method of configuring the virtual network 1 (102) according to the first embodiment uses the PBB. On the other hand, this embodiment uses the tunnel mode of the security architecture for internet protocol (IPsec) illustrated in FIG. 20 (FIG. 20 illustrates the format of the communication packet on the virtual network 2 (104) side according to the second embodiment, but the third embodiment uses the format of the communication packet on the virtual network 1 (102) side.). As described in the second embodiment, in the tunnel mode of the IPsec, the packet of the user is encrypted and encapsulated by the tunnel IP header. The packet is transferred between a source and a destination by the tunnel IP header, thereby enabling the virtual network 103 for each user to be configured.

As illustrated in FIG. 25, a tunnel using the IPsec is configured between the edge node 303 and the machine allocation device 101. The IP address or a security parameter index (SPI) on the edge node 303 side is used for identification of each user. Accordingly, the IP address on the edge node 303 side is used for an identifier K2401 of the virtual network 1 of the user service information 411 illustrated in FIG. 24. Other data of the user service information 411 in FIG. 24 is identical with the user service information 411 according to the first embodiment illustrated in FIG. 9. As illustrated in FIG. 25, in this embodiment, a gateway (GW) 2501 of the IPsec is installed in the virtual network 1 edge 408 in the machine allocation device 101. Also, a gateway (GW) 2502 of the IPsec is also installed in the edge node 303. In FIG. 25, the machine 106 is omitted.

The machine allocation method according to this embodiment is different from the machine allocation method according to the first embodiment illustrated in FIG. 13 in that the information on the tunnel of the IPsec is used in Step S1310 for transferring the communication packet of the user between the virtual network 1 (102) and the virtual network 2 (104).

(Step S1310)

In Step S1310, the virtual network relay unit 406 is configured to transfer the communication packet of the user between the virtual network 1 (102) and the virtual network (104) due to the relay information between the networks illustrated in FIG. 26.

FIG. 26 illustrates the relay information between the networks which is held by the transfer processor 401 in a tabular form T2601. The tabular form T2601 includes the port No. K1701 of the machine allocation device connected with the virtual network 103, and an identifier K2601 using the IP address of the edge node as the information on the virtual network 1 (102) side, and the port No. K1703 and the IP address K1704 of the machine allocation device connected with the corresponding virtual network 105, as the information on the virtual network 2 (104) side.

FIG. 44 illustrates the relay information between the networks in which the information on the user B is updated. As illustrated in FIG. 44, the port No. K1703 and the identifier K1704 of the machine allocation device in the virtual network 2 (104) related to the user B are updated.

D. Fourth to Sixth Embodiments

S1306: Machine Determination Method

1. Fourth Embodiment

Subsequently, a description will be given of a system using a machine allocation device according to a fourth embodiment of the present invention. This embodiment is identical with the system using the machine allocation device according to the first embodiment except that the method of determining the machine 106 on which the application 108 operates is different. Accordingly, only different portions from those in the first embodiment will be described below, and the same portions will be omitted from the description.

Hereinafter, a description will be given of a method of allocating the machine in the machine allocation device 101 with reference to FIG. 27. FIG. 27 is an illustrative view illustrating an example of machine information held by the machine allocation device according to the fourth embodiment of the present invention. The machine allocation method according to this embodiment is different from the machine allocation method according to the first embodiment illustrated in FIG. 13 in that the machine allocation determination unit 412 determines the machine 106 so that a power consumption of the machine 106 is reduced, in Step S1306 for determining the machine 106 on which the application 108 newly operates.

FIG. 27 illustrates the machine information 415 according to this embodiment in a tabular form T2701. The tabular form T2701 includes a value K2701 of a present average power consumption and a power consumption function K2702 specific to each machine 106 in addition to the machine information 415 of the first embodiment in FIG. 11. The power consumption function K2702 is, for example, a function having a variable P (power consumption value) and a variable ΔL (load variation). The power consumption function K2702 may be another format if an increment of the power consumption when newly adding the application is found from that information. For example, when the application 108 of the user B is newly added, the machine allocation determination unit 412 calculates the increment in the power consumption of each machine 106 as follows.

Increment in the power consumption of the machine
(PS1) $f\Delta$P1(300 W,ΔL1)=20 W Increment in the power consumption of the machine
(PS2) $f\Delta$P2(200 W,ΔL1)=30 W Increment in the power consumption of the machine
(PS3): $f\Delta$P3(0 W,ΔL1)=100 W When the above calculation results are obtained, the machine (PS1) 106 smaller in the increment of the power consumption is selected. In this example, it is needless to say that the average load rate K1103 is taken into account so as to prevent an overload.

2. Fifth Embodiment

Subsequently, a description will be given of a system using a machine allocation device according to a fifth embodiment of the present invention. This embodiment is identical with the system using the machine allocation device according to the first embodiment except that the method of determining the machine 106 on which the application 108 operates is different. Accordingly, only different portions from those in the first embodiment will be described below, and the same portions will be omitted from the description.

Hereinafter, a description will be given of a method of allocating the machine in the machine allocation device 101 with reference to FIG. 28. FIG. 28 is an illustrative view illustrating an example of the virtual network 2 information held by the machine allocation device. The machine allocation method according to this embodiment is different from the machine allocation method according to the first embodiment illustrated in FIG. 13 in that the machine allocation determination unit 412 determines the machine 106 taking a load of the virtual network 104, that is, a bandwidth use rate into account, in Step S1306 for determining the machine 106 on which the application 108 newly operates. FIG. 28 illustrates the virtual network 2 information 417 in a tabular form T1201. The tabular form T1201 includes an average use bandwidth K2801 indicative of a load of the appropriate port on the network in addition to the virtual network 2 information 417 according to the first embodiment in FIG. 12. A physical network topology of the virtual network 2 information 417 in FIG. 28 is identical with that in the first embodiment as illustrated in FIG. 16. In an example illustrated in FIG. 28, since an average use bandwidth of the network of the machine (PS1) 106 is 100 Mbps, and the average use bandwidth of the network of the machine (PS2) 106 is 50 Mbps, the machine allocation determination unit 412 selects the machine lower in the load, that is, the machine (PS2) 106. In this embodiment, the machine 106 is selected with the use of the average use bandwidth of the network. However, the machine 106 may be selected taking other network information, for example, priority information for each application 108, and a communication type (messaging, streaming, etc.) of the application 108 into account.

3. Sixth Embodiment

Subsequently, a description will be given of a system using a machine allocation device according to a sixth embodiment of the present invention. This embodiment is identical with the system using the machine allocation device according to the first embodiment except that the method of determining the machine 106 on which the application 108 operates is different. Accordingly, only different portions from those in the first embodiment will be described below, and the same portions will be omitted from the description.

Hereinafter, a description will be given of a method of allocating the machine in the machine allocation device 101 with reference to FIG. 29. FIG. 29 is an illustrative view illustrating an example of user service information held by a machine allocation device according to a sixth embodiment of the present invention. The machine allocation method according to this embodiment is different from the machine allocation method according to the first embodiment illustrated in FIG. 13 in that the machine allocation determination unit 412 determines the machine 106 taking a past service use history of the user into account, in Step S1306 for determining the machine 106 on which the application 108 newly operates.

FIG. 29 illustrates the user service information 411 in a tabular form T2901. The tabular form T2901 includes an average load K2901 of the application 108 providing the service, and an average use time K2902 as information on the service use history for each user, in addition to the user service information 411 in the first embodiment of FIGS. 9 and 12. As the method of determining the machine 106, there is, for example, a method of determining the machine 106 according to the average load K2901. That is, the machine (PS1) 106 is determined when the average load is 20 or more, and the machine (PS2) 106 is determined when the average load is less than 20. Also, as another example, there is a method of determining the machine 106 according to the average use time K2902. That is, the machine (PS1) 106 is determined when the average use time is 60 minutes or longer, and the machine (PS2) 106 is determined when the average use time is shorter than 60 minutes.

4. Additional Statement

In the above-mentioned fourth to sixth embodiments of the present invention, the method of determining the machine 106 on which the application 108 newly operates by the machine allocation determination unit 412 is described by different implementing methods. Those methods may be implemented in the respective embodiments, independently, or those embodiments may be combined together.

E. Seventh Embodiment

Method of Operating Application 108

Subsequently, a description will be given of a system using a machine allocation device according to a seventh embodiment of the present invention. This embodiment is identical with the system using the machine allocation device according to the first embodiment except that the method of operating the application 108 providing the service to the user is different. Accordingly, only different portions from those in the first embodiment will be described below, and the same portions will be omitted from the description.

Figure 30:
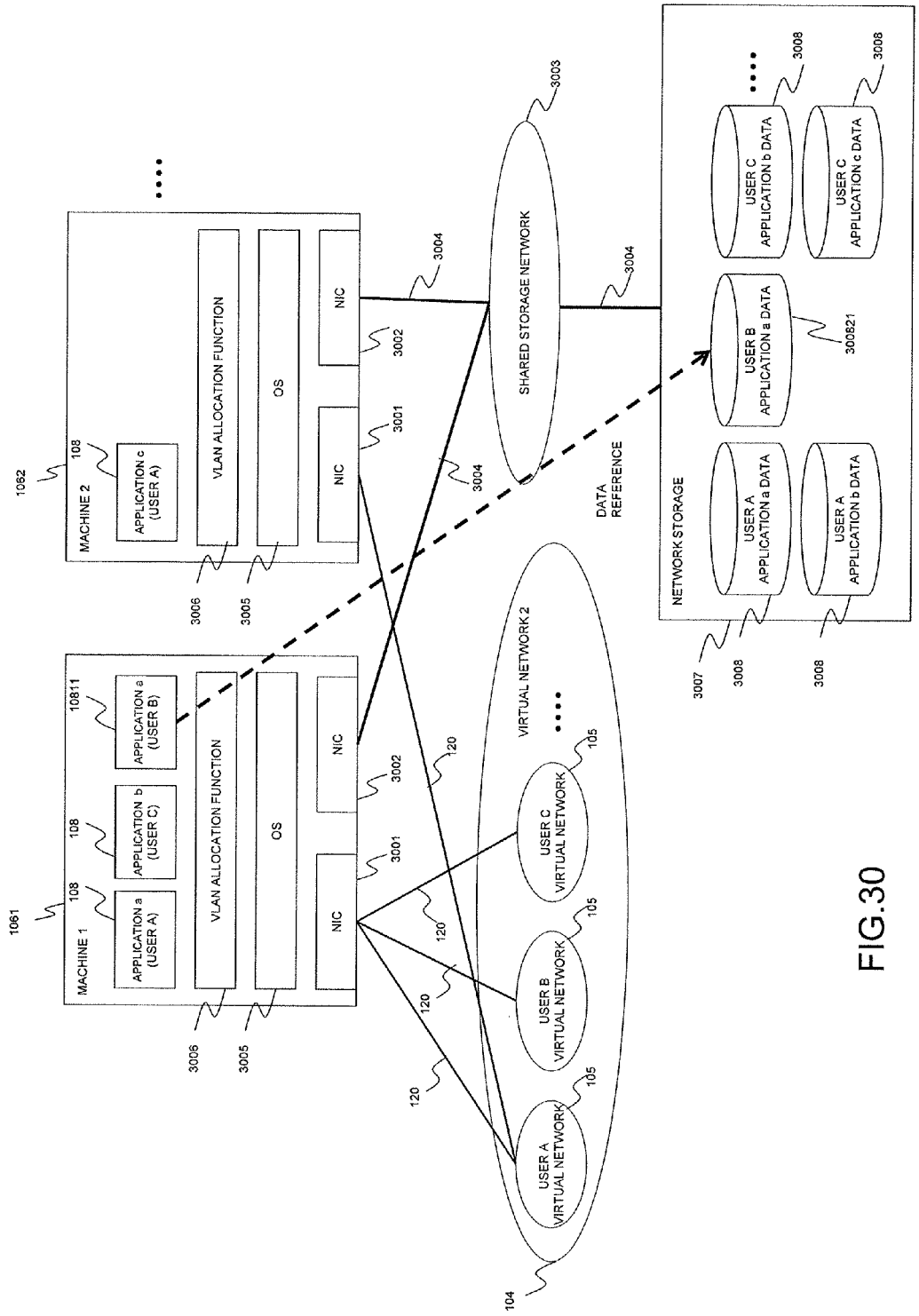
FIG. 30 is an illustrative view illustrating one example of a method of starting an application according to a seventh embodiment.
Figure 31:
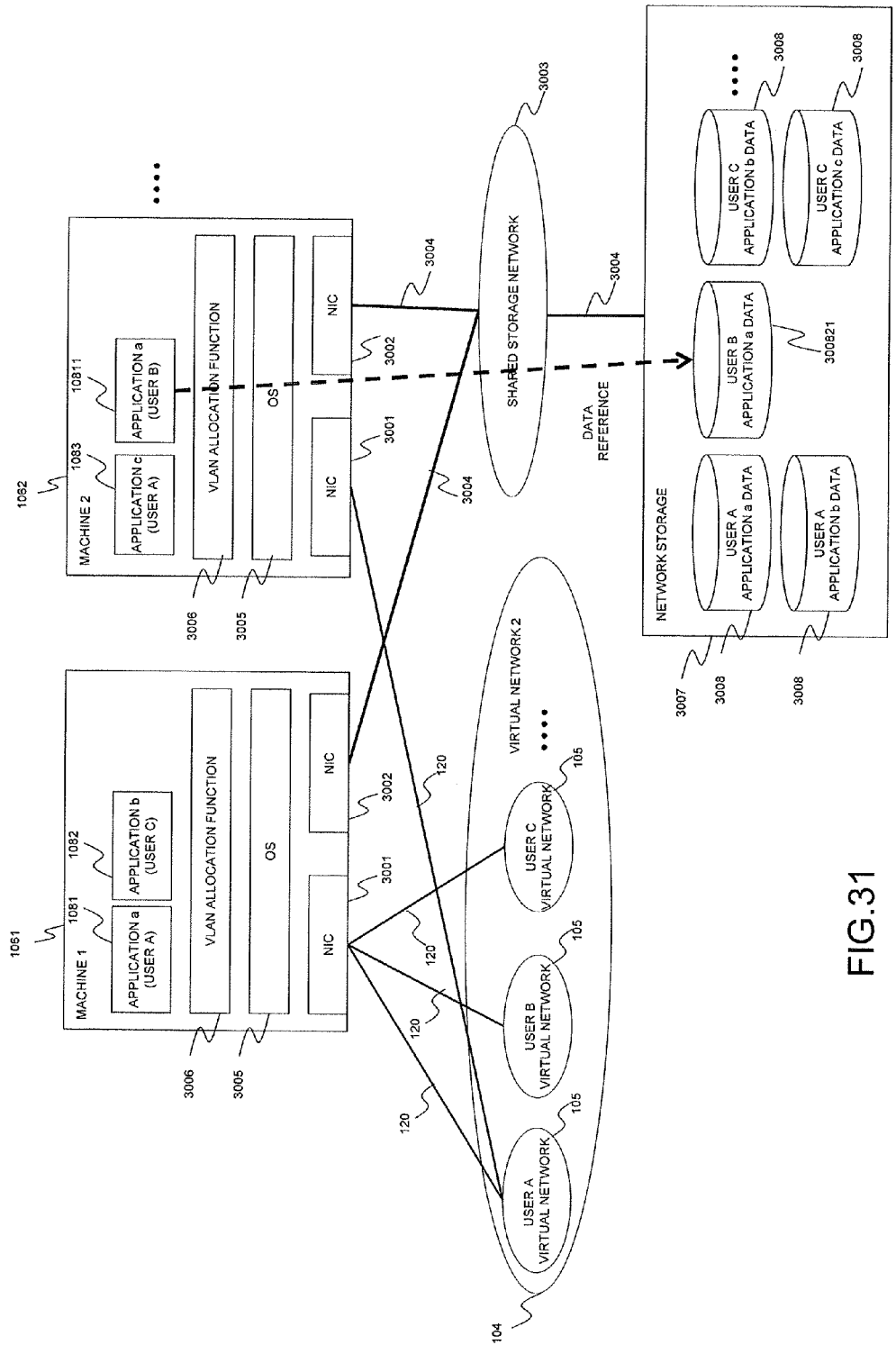
FIG. 31 is an illustrative view illustrating another example of the method of starting the application according to the seventh embodiment.

A description will be given of a configuration of the machine allocation device 101 and a method of allocating the machine with reference to FIGS. 30 and 31. FIGS. 30 and 31 are illustrative views illustrating an example of a method of starting the application according to the seventh embodiment of the present invention. As illustrated in FIG. 30, in this embodiment, each of the machines 1061 and 1062 includes a physical network interface card (NIC) 3001 for connection to the virtual network 2, a physical network interface card (NIC) 3002 for connection to a shared storage network 3003, an operating system (OS) 3005, a VLAN allocation function 3006, and applications 108 and 10811. Also, the shared storage network 3003 is connected with a network storage 3007 which is a storage device holding data 3008 of the respective applications. In FIG. 30, reference numeral 3004 indicates a logical connection of the shared storage network 3003. In FIGS. 30 and 31, a configuration on the home 110 side of the user with respect to the machine allocation device 101 is simple, and therefore will be omitted. In this embodiment, separation of the applications 108 and 10811 for each user is conducted by the VLAN allocation function 3006. That is, as in the first embodiment, the VID such as IEEE802.1Q is used for identifying each user in the virtual network 2 (104). The VLAN allocation function 3006 associates the applications 108 and 10811 with the VIDs, and transfers the communication packets with the aid of the VIDs identifying the users.

Also, the machine allocation method according to this embodiment is different from the machine allocation method according to the first embodiment illustrated in FIG. 13 in that the virtual machine 107 is not started, but the applications 108 and 10811 are started, in Step S1309 for starting the application 108 under the control by the machine controller 413. A mechanism in which the application 108 can start on any machine 106 is illustrated in FIGS. 30 and 31. FIG. 30 illustrates a configuration when the application a (10811) of the user B operates on the machine 1 (1061), and FIG. 31 illustrates a configuration when the application a (10811) of the user B operates on the machine 2 (1062). Since data 300821 of the application a (10811) of the user B is held on the network storage 3007 accessible from any machines 1061 and 1062, the application can operate even if the operating machine 1061 or 1062 is changed to another. Also, as a specific method of starting the applications 108 and 10811, there is a method of starting the applications 108 and 10811 with the aid of a message specific to the application from the machine controller 413.

F. Eighth to Eleventh Embodiments

Function Distribution

1. Eighth Embodiment

Terminal Function

Subsequently, a description will be given of a system using a machine allocation device according to an eighth embodiment of the present invention. This embodiment is identical with the system using the machine allocation device according to the first embodiment except the configuration of the device of the user. Accordingly, only different portions from those in the first embodiment will be described below, and the same portions will be omitted from the description.

Figure 32:
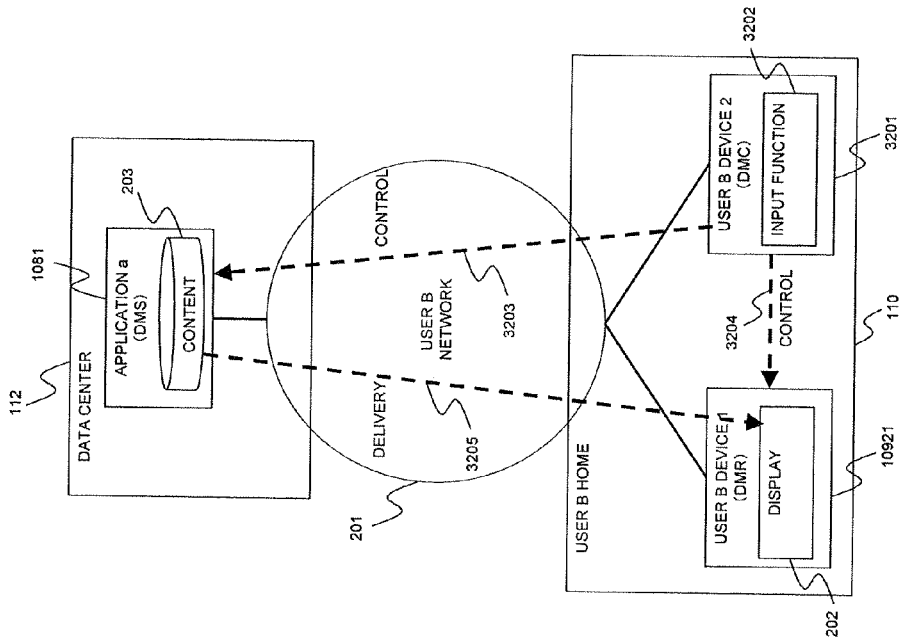
FIG. 32 is an illustrative view illustrating an example in which a user B uses a service according to an eighth embodiment.

A description will be given of a configuration of the machine allocation device 101 with reference to FIG. 32. FIG. 32 is an illustrative view illustrating an example of using the service of the user B according to the eighth embodiment of the present invention. In the first embodiment, as an example of the media server, as illustrated in FIG. 2, when a digital media server (DMS) is used as the application a (1081), and a digital media renderer (DMR) is used as the user B device 1 (10921), the number of user devices 109 using the application 108 is one. On the other hand, a description will be given of a case in which the number of user devices 109 using the application 108 is plural according to this embodiment. As illustrated in FIG. 32, in this embodiment, a user B device 2 (3201) is added to the home 110 side in the first embodiment of FIG. 2. For example, in the standards "digital living network alliance (DLNA)", the user B device 2 (3201) is a digital media controller (DMC) that controls the application a (1081) (DLNA server) that is the DMS, and the user B device 1 10921 (TV) that is the DMR. Also, the user B device 2 (3201) has a user interface (input function) 3202 for remote control by the user. The application a (1081), the user B device 1 (10921), and the user B device 2 (3201) are connected by the L2-VPN network 201. The DLNA server 1081 and the TV (10921) receive requests 3203 and 3204 from the DMC, respectively, the DLNA server 1081 delivers the video content 203 to the TV (10921) (3205), and the TV (10921) displays a video delivered to the display 202. In this embodiment, the machine allocation device 101 receives the start packet from the user B device 2 (3201), and the method of allocating the machine is identical with that in the first embodiment.

2. Ninth Embodiment

Terminal Function

Subsequently, a description will be given of a system using a machine allocation device according to a ninth embodiment of the present invention. This embodiment is identical with the system using the machine allocation device according to the first embodiment except the configuration of the device of the user. Accordingly, only different portions from those in the first embodiment will be described below, and the same portions will be omitted from the description.

Figure 33:
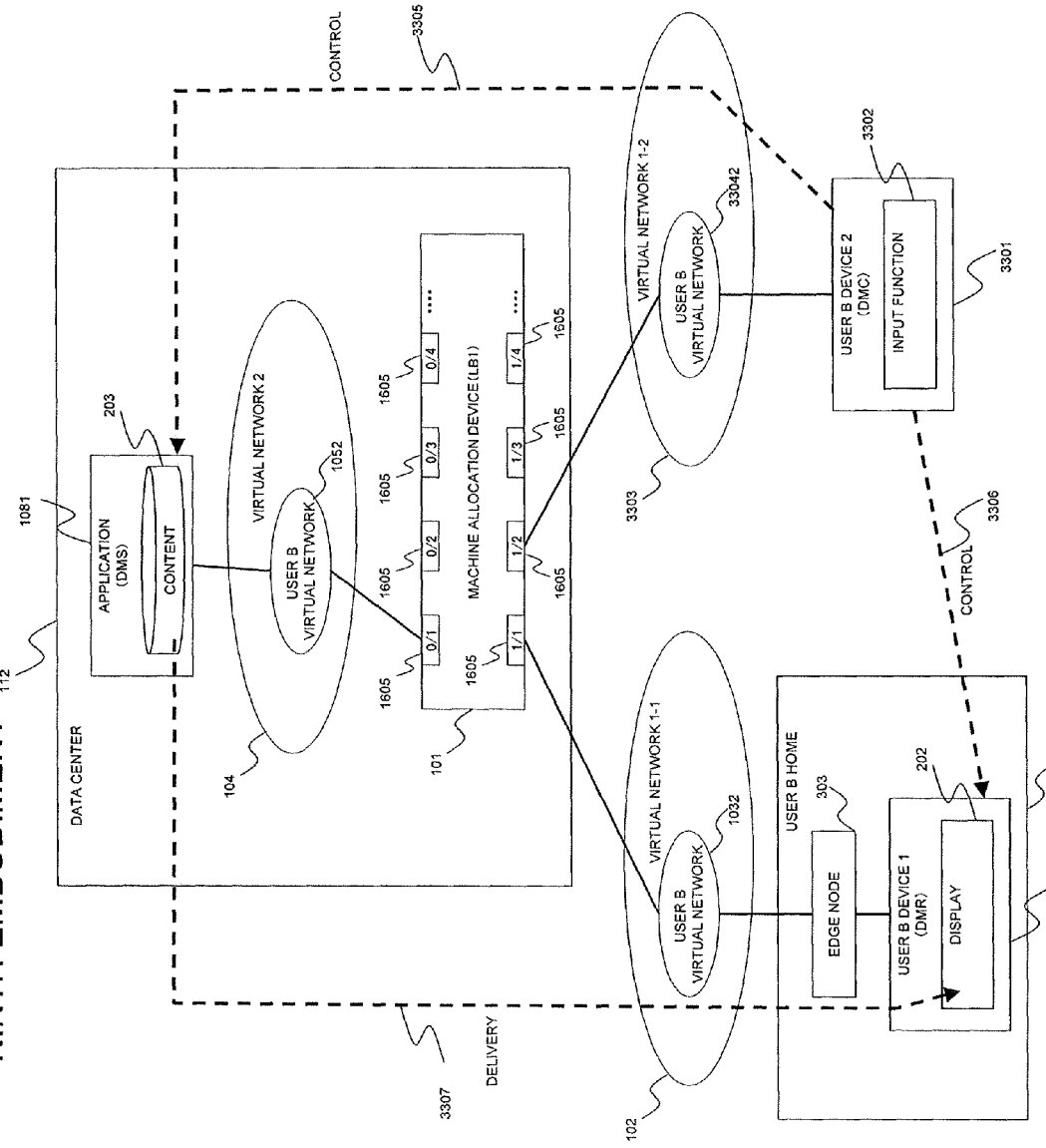
FIG. 33 is an illustrative view illustrating an example in which a user B uses a service according to a ninth embodiment.

A description will be given of a configuration of the machine allocation device 101 with reference to FIG. 33. FIG. 33 is an illustrative view illustrating an example of using the service of the user B according to the ninth embodiment of the present invention. In this embodiment, the number of user devices 109 using the application 108 is plural as in the eighth embodiment. However, this embodiment is different from the eighth embodiment in that the user devices 109 are not in the same home 110. That is, as illustrated in FIG. 33, a user B device 2 (3301) is out of the home 110 of the user B, for example, outdoors or in a public facility. The user B device 2 (3301) is connected to the machine allocation device 101 of the data center 112 through a virtual network 33042 for each user B in another virtual network 1-2 (3303). As in the eighth embodiment, for example, in the standards "digital living network alliance (DLNA)", the user B device 2 (3301) is a digital media controller (DMC) that controls the application a (1081) (DLNA server) which is the DMS, and the user B device 1 (10921) (TV) which is the DMR. Also, the user B device 2 (3301) has a user interface (input function) 3302 for remote control by the user.

The application a (1081), the user B device 1 (10921), and the user B device 2 (3301) are connected by the L2-VPN network 201. The DLNA server 1081 and the TV (10921) receive requests 3305 and 3306 from the DMC, respectively, the DLNA server 1082 delivers (3307) the video content 203 to the TV (10921), and the TV (10921) displays a video delivered to the display 202. In this embodiment, the machine allocation device 101 receives the start packet from the user B device 2 (3301), and can deal with the start packet from the virtual network 1-2 (3303) side, and the method of allocating the machine is identical with that in the first embodiment.

3. Tenth Embodiment

Machine Allocation Function

Subsequently, a description will be given of a system using a machine allocation device according to a tenth embodiment of the present invention. This embodiment is identical with the system using the machine allocation device according to the first embodiment except the configuration of the device of the user. Accordingly, only different portions from those in the first embodiment will be described below, and the same portions will be omitted from the description.

Figure 34:
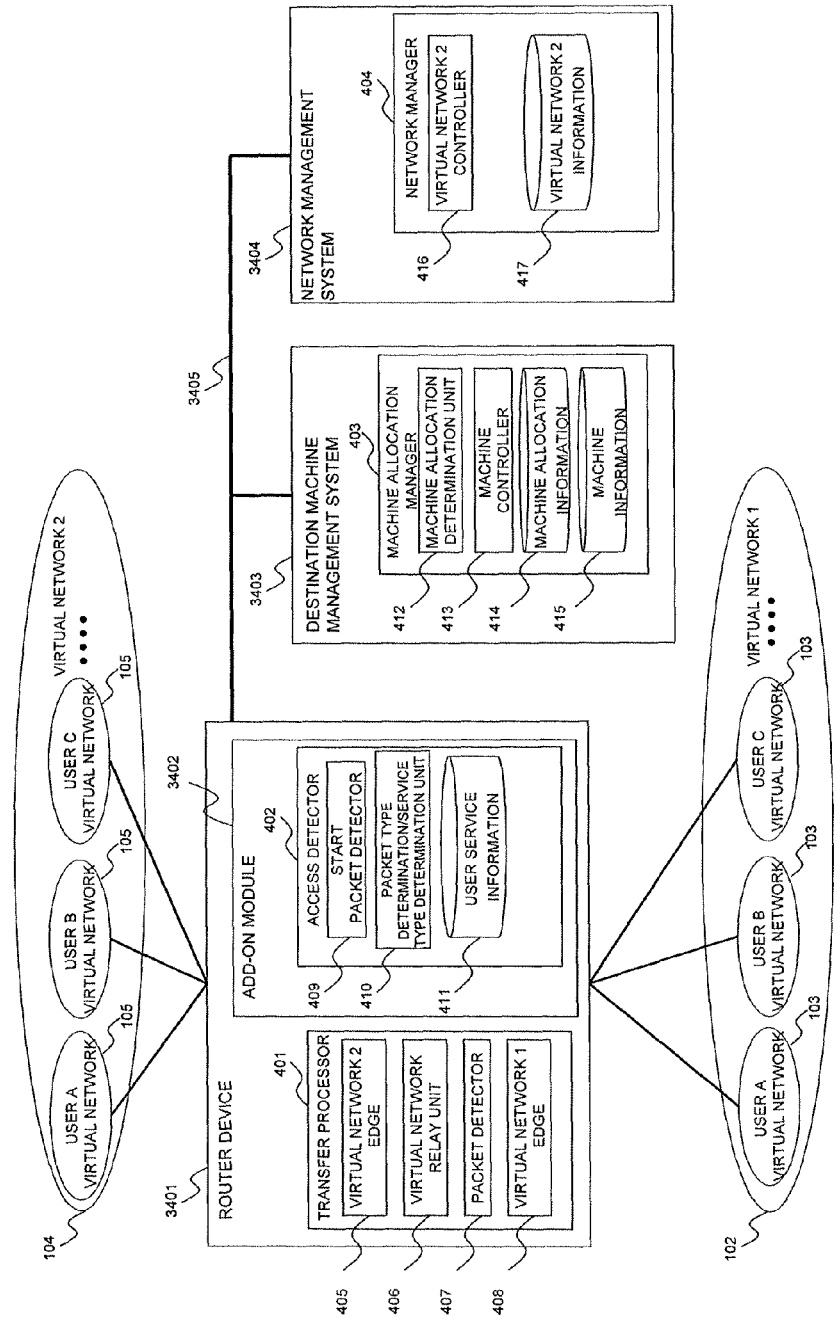
FIG. 34 is a block diagram illustrating a configuration of a machine allocation device according to a tenth embodiment.
Figure 35:
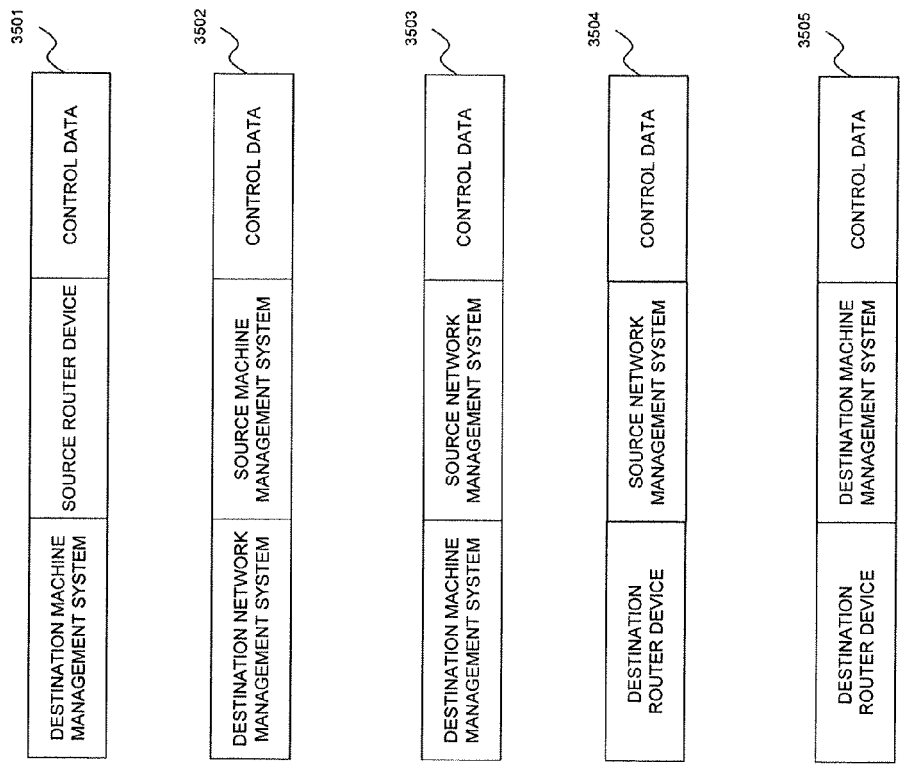
FIG. 35 is an illustrative view illustrating an example of a control interface between devices according to the tenth embodiment.

A description will be given of a configuration of the machine allocation device 101 with reference to FIG. 34 and FIG. 35. FIG. 34 is a block diagram illustrating a configuration of a machine allocation device according to a tenth embodiment of the present invention. FIG. 35 is an illustrative view illustrating an example of a control interface between devices according to the tenth embodiment of the present invention. As illustrated in FIG. 34, in this embodiment, a functional part of the machine allocation device 101 is dispersed into plural devices, a router device 3401, a machine management system 3403, and a network management system 3404. That is, the transfer processor 401 is installed in the router device 3401, the access detector 402 is installed in an add-on module 3402 mounted in the router device 3401, the machine allocation manager 403 is installed in the machine management system 3403, and the network manager 404 is installed in the network management system 3404. In FIG. 34, for simplification, the machine 106 and the home 110 of the user are omitted. In this way, the functional part of the machine allocation device 101 is dispersed, and the method of allocating the machine is identical with that in the first embodiment. However, because the functional part of the machine allocation device 101 is dispersed, there is a need to communicate among the dispersed functional parts. As the communication method, there is used a messaging using a management LAN or a control interface 3405 of a dedicated interface. Accordingly, in the machine allocation method according to this embodiment, a communication among the respective functional parts is added to the machine allocation method according to the first embodiment illustrated in FIG. 13.

Hereinafter, the added communication will be described. In Step S1305 for determining whether there is a need to newly start the service, or not, if it is determined that there is a need to start the service, the packet type determination/service type determination unit 410 notifies the machine management system 3403 of the user identifier K901, the identifier K904 of the service, the type K905 of the service, and the identifier K907 of the virtual network 2 in an interface format 3501 of FIG. 35. In Step S1306 for determining the machine 106 on which the application 108 newly operates, the machine allocation determination unit 412 notifies the network management system 3404 of the user identifier K901, the identifier K907 of the virtual network 2, the identifier K1101 of the machine 106 on which the application 108 starts, and the identifier K1104 of the virtual machine in an interface format 3502 of FIG. 35. In Step S1308 for generating the virtual network 105 on the virtual network 2 (104), the virtual network 2 controller 416 notifies the machine management system 3403 and the router device 3401 of completion information on validation of the virtual network 105 and the identifier of the virtual network 105 in interface formats 3503 and 3504 of FIG. 35. In Step S1309 for starting the application 108, the machine controller 413 notifies the router device 3401 of start completion information on the application 108 in an interface format 3505 of FIG. 35.

4. Eleventh Embodiment

Machine Allocation Function

Subsequently, a description will be given of a system using a machine allocation device according to an eleventh embodiment of the present invention. This embodiment is identical with the system using the machine allocation device according to the first embodiment except the configuration of the device of the user. Accordingly, only different portions from those in the first embodiment will be described below, and the same portions will be omitted from the description.

Figure 36:
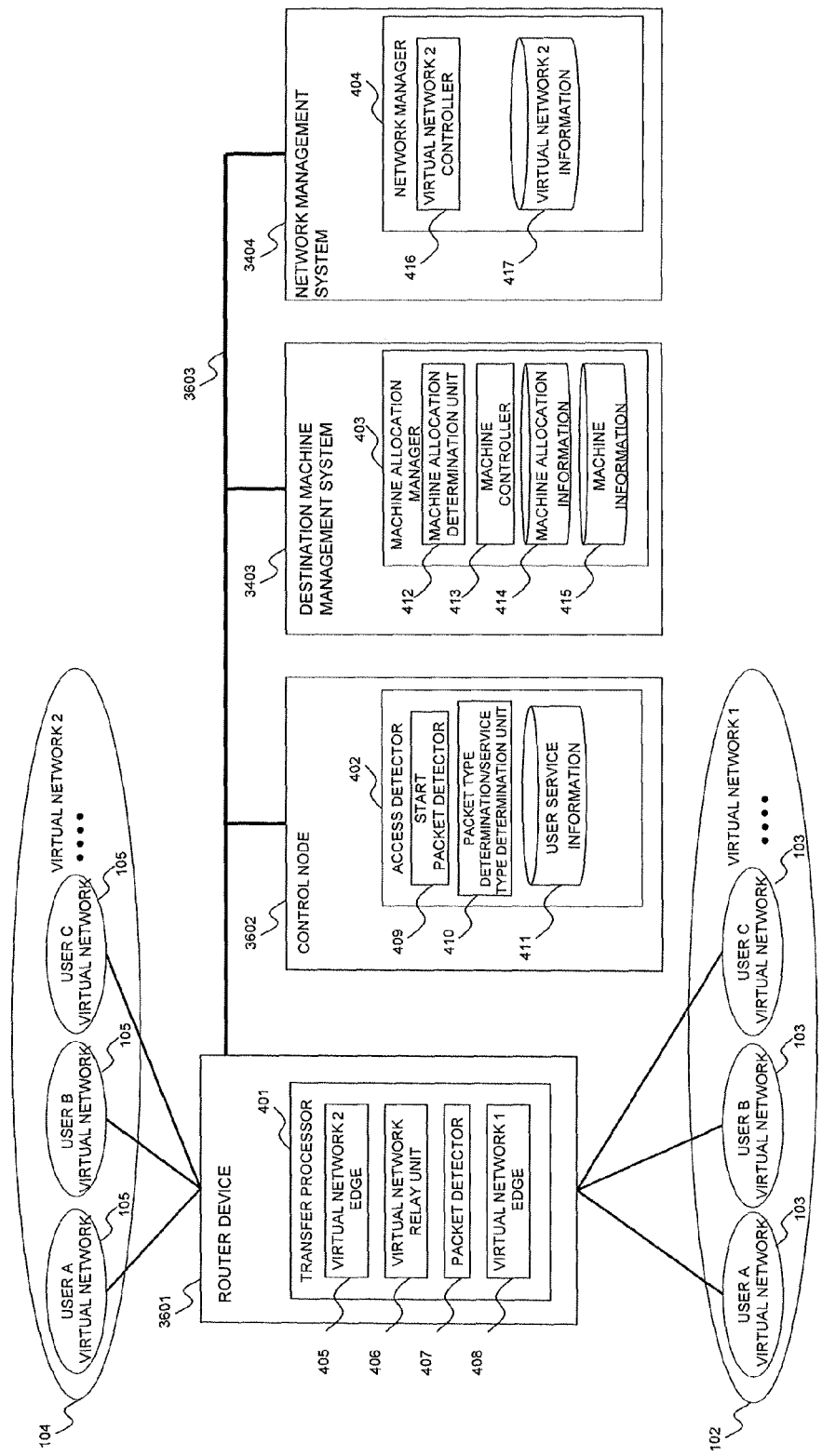
FIG. 36 is a block diagram illustrating a configuration of a machine allocation device according to an eleventh embodiment.
Figure 37:
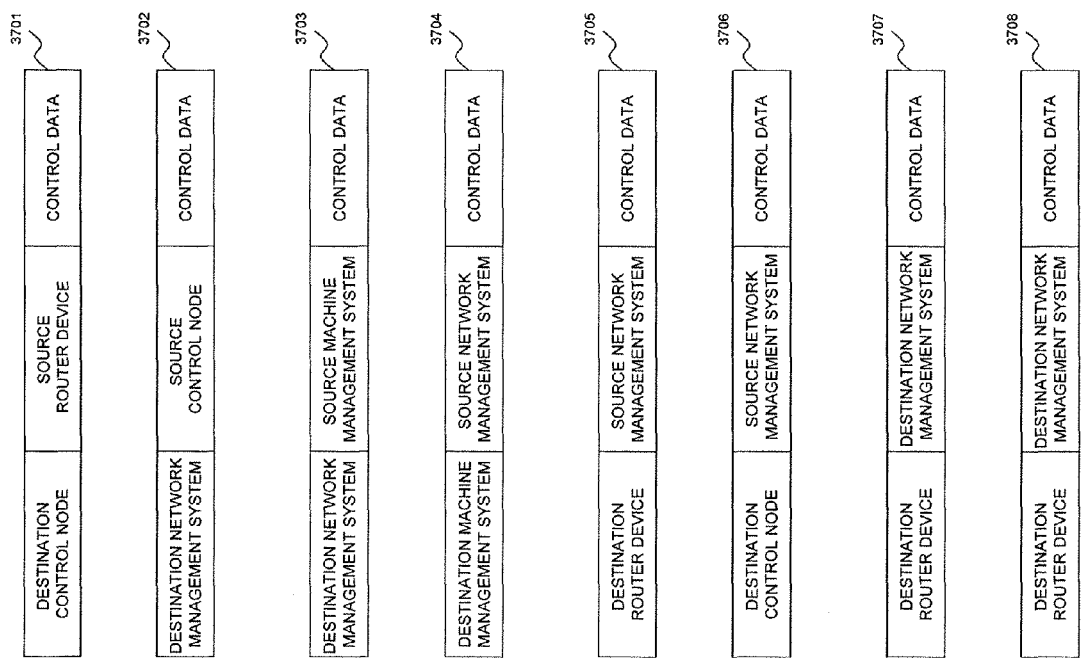
FIG. 37 is an illustrative view illustrating an example of a control interface between devices according to the eleventh embodiment.

A description will be given of a configuration of the machine allocation device 101 with reference to FIG. 36 and FIG. 37. FIG. 36 is a block diagram illustrating a configuration of a machine allocation device according to an eleventh embodiment of the present invention. FIG. 37 is an illustrative view illustrating an example of a control interface between devices according to the eleventh embodiment of the present invention. As illustrated in FIG. 36, in this embodiment, a functional part of the machine allocation device 101 is dispersed into plural devices, a router device 3601, a control node 3602, the machine management system 3403, and the network management system 3404. That is, the transfer processor 401 is installed in the router device 3601, the access detector 402 is installed in the control node 3602, the machine allocation manager 403 is installed in the machine management system 3403, and the network manager 404 is installed in the network management system 3404. In FIG. 36, for simplification, the machine 106 and the home 110 of the user are omitted. In this way, the functional part of the machine allocation device 101 is dispersed, and the method of allocating the machine is identical with that in the first embodiment. However, because the functional part of the machine allocation device 101 is dispersed, there is a need to communicate among the dispersed functional parts. As the communication method, there is used a messaging using a management LAN or a control interface 3603 of a dedicated interface as in the tenth embodiment. Accordingly, in the machine allocation method according to this embodiment, a communication among the respective functional parts is added to the machine allocation method according to the first embodiment illustrated in FIG. 13.

Hereinafter, the added communication will be described. In Step S1302 for extracting the start packet, the packet detector 407 notifies the control node 3602 of data of the extracted communication packet in an interface format 3701 of FIG. 37. In Step S1305 for determining whether there is a need to newly start the service, or not, if it is determined that there is a need to start the service, the packet type determination/service type determination unit 410 notifies the machine management system 3403 of the user identifier K901, the identifier K904 of the service, the type K905 of the service, and the identifier K907 of the virtual network 2 in an interface format 3702 of FIG. 37. In Step S1306 for determining the machine 106 on which the application 108 newly operates, the machine allocation determination unit 412 notifies the network management system 3404 of the user identifier K901, the identifier K907 of the virtual network 2, the identifier K1101 of the machine 106 on which the application 108 starts, and the identifier K1104 of the virtual machine in an interface format 3703 of FIG. 37. In Step S1308 for generating the virtual network 105 on the virtual network 2 (104), the virtual network 2 controller 416 notifies the machine management system 3403, the router device 3601, and the control node 3602 of completion information on validation of the virtual network 105 and the identifier of the virtual network 105 in interface formats 3704, 3705, and 3706 of FIG. 37. In Step S1309 for starting the application 108, the machine controller 413 notifies the router device 3601 and the control node 3602 of start completion information on the application 108 in interface formats 3707 and 3708 of FIG. 37.

G. Twelfth Embodiment

Graphical Interface

Subsequently, a description will be given of a system using a machine allocation device according to a twelfth embodiment of the present invention. In this embodiment, a graphical interface for managing the machine allocation device is added to the configuration of the system using the machine allocation device and the machine allocation device according to the first embodiment. Accordingly, only different portions from those in the first embodiment will be described below, and the same portions will be omitted from the description.

Figure 38:
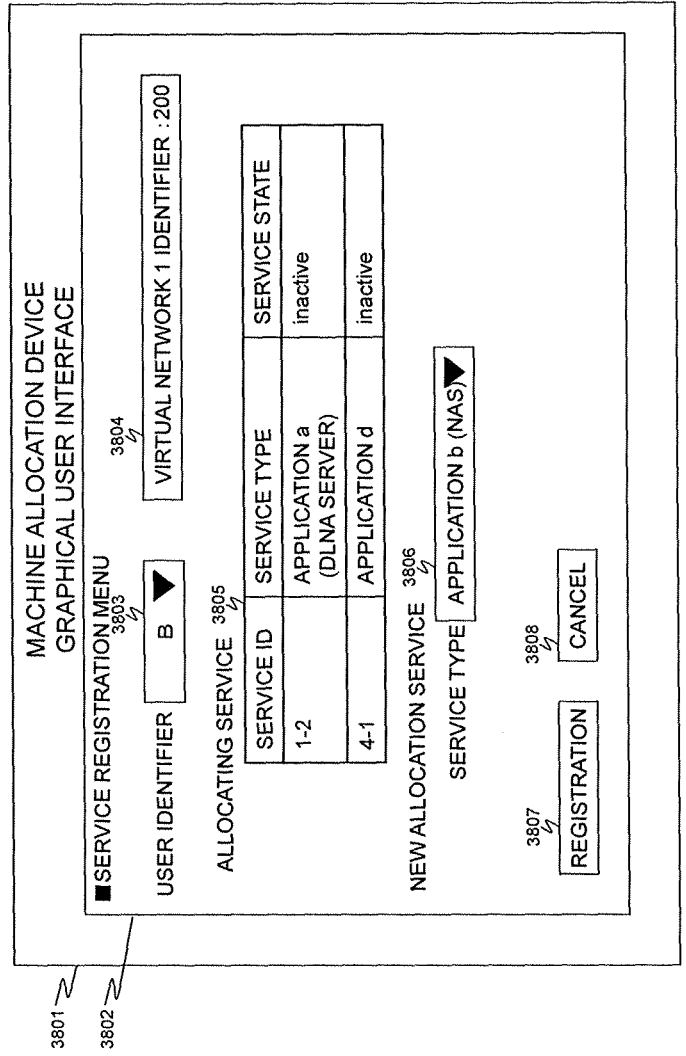
FIG. 38 is an illustrative view illustrating an example of a graphical interface of a machine allocation device according to a twelfth embodiment.

Hereinafter, a description will be given of the graphical interface for managing the machine allocation device 101 with reference to FIG. 38. FIG. 38 is an illustrative view illustrating an example of the graphical interface of the machine allocation device according to the twelfth embodiment of the present invention. A graphical interface 3801 for managing the machine allocation device 101 illustrated in FIG. 38 is displayed on the management terminal 418 illustrated in FIG. 4. A manager that manages the machine allocation device 101 conducts the operation management from the management terminal 418. An example illustrated in FIG. 38 shows a service registration menu 3802 that newly registers the services provided to the user. The service registration menu 3802 includes, for example, a pull down menu 3802 for selecting the users, a virtual network 1 identifier 3804 of the selected user, a list 3805 of the services which are being allocated to the user, a pull down menu 3806 for selecting a service to be newly allocated, a service registration button 3807, and a button 3808 for canceling the service registration. The service registration button 3807 is clicked to complete the allocation of the service to the user, and the service is saved in the user service information 411.

The present invention made by the present inventors has been described above in detail with reference to the embodiments. However, the present invention is not limited to the above embodiments, but can be variously changed without departing from the subject matter thereof. The network system having the machine allocation device according to the present invention is suitable for a system in which the users in a distant home or company area use the machine installed in the data center through the wide area network.

Also, the L2-VPN has been mainly described above. However, the present invention is not limited to this configuration, but can be applied to a variety of VPNs. Further, the present invention can employ a variety of encrypting functions (protocols) and/or authenticating functions (protocols) with respect to the IPSec.

The specification and drawings are, accordingly, to be regarded in an illustrative rather than a restrictive sense. It will, however, be evident that various modifications and changes may be made thereto without departing from the spirit and scope of the invention(s) as set forth in the claims.

What is claimed is:

1. A network system having a first virtual network configuring a virtual network for each user which is connected to a terminal of the user, a plurality of machines on which applications to be used from the terminal by the user operate, and a second virtual network configuring a virtual network for each user which is connected to the plurality of machines, the network system comprising:

a machine allocation device that is connected to the first virtual network and the second virtual network, wherein the machine allocation device includes:

a transfer processor that relays communication packets of the user between the first virtual network and the second virtual network;

an access detector that detects an access from the user;

a machine allocation manager that determines any one of the plurality of machines;

a network manager that manages the network;

a user service information storage unit that stores user service information including a service state indicative of an operating state of each application and a second virtual network identification information indicative of an identifier of each user over the second virtual network, in correspondence with a preset first virtual network identifier indicative of the identifier of the user over the first virtual network, a preset service identifier for identifying each application providing a service to the user, and a preset service type indicative of each allocatable application;

a machine allocation information storage unit that stores machine allocation information including a virtual machine identifier for identifying a virtual machine on which the application operates and a service identifier for identifying the application that operates on the virtual machine, in correspondence with a preset machine identifier;

a relay information storage unit that stores relay information including an identification information on a second virtual network side, in correspondence with an identification information on a first virtual network side; and a second virtual network information storage unit that stores the second virtual network identification information configuring a user virtual network over the second virtual network between the machine and the machine allocation device, wherein the transfer processor detects a communication packet transmitted from the terminal and received through the first virtual network, the access detector detects a start packet to be sent when starting the terminal from the received communication packet, determines the first virtual network identifier and the service type indicative of the application to be used by the terminal according to information on the communication packet and the start packet, and obtains the service state on the basis of the first virtual network identifier and the service type with reference to the user service information, when the service state is non-allocated or stopping, the machine allocation manager determines the machine on which the determined application operates according to a predetermined procedure, and specifies the virtual machine on the determined machine, the network manager obtains non-allocated virtual network identification information in one or a plurality of entries indicative of a connection between the determined machine and the machine allocation device, with reference to the second virtual network information, the network manager adds the virtual network identification information to the one or the plurality of entries of the second virtual network information or another entry of the second virtual network information, and updates the virtual network identification information to configure the user virtual network on the second virtual network, the machine allocation manager starts the specified virtual machine on the machine, and operates the application, the machine allocation manager sets the virtual network identification information to the identification information on the second virtual network side corresponding to the first virtual network identifier with respect to the relay information and, for an entry corresponding to the first virtual network identifier and the service type with respect to the user service information, sets the service state to be allocated or to be operating and sets the virtual network identification information to the second network identifier, and sets the virtual machine identifier of the started virtual machine and the service identifier with respect to the machine allocation information, and the transfer processor transfers the communication packet of the user between the first virtual network and the second virtual network on the basis of the relay information.

2. The network system according to claim 1, wherein
the second virtual network information storage unit stores the second virtual network identification information including destination identification information and virtual network identification information set for each port, for each of a plurality of ports provided in one or a plurality of switches configuring the second virtual network, and each of a plurality of ports provided in the machine allocation device,
the virtual network identification information is a virtual LAN identifier (VLAN ID), and
the network manager adds the virtual network identification information to the one or the plurality of entries of the second virtual network information, and updates the virtual network identification information to configure the user virtual network on the second virtual network.

3. The network system according to claim 1, wherein
the second virtual network information storage unit stores the second virtual network information including a second termination address that terminates a tunnel of an encrypting function on a machine side and/or a security parameter index (SPI), which is the second virtual network identification information, in correspondence with the service identifier, an identifier and a port No. of the machine allocation device, which are configuration information of the machine allocation device, and a first termination address that terminates the tunnel having the encrypting function on a machine allocation device side,
a first gateway having the encrypting function is provided in an edge of the second virtual network in the machine allocation device,
a second gateway having the encrypting function is provided within the virtual machine of each machine,
the tunnel having the encrypting function is configured between the first and second gateways having the encrypting function to configure the virtual network for each user,
the virtual network identification information is the second termination address and/or the SPI, and
the network manager adds the obtained second termination address and/or the SPI which are the second virtual network identification information, in correspondence with the identifier and the port No. of the machine allocation device, and the first termination address, and updates the second virtual network identification information to configure the user virtual network on the second virtual network.

4. The network system according to claim 1, wherein
a first gateway having an encrypting function is provided in an edge of the first virtual network in the machine allocation device,
a second gateway having the encrypting function is provided in an edge node provided on a terminal side of the user,
a tunnel having the encrypting function is configured between the first and second gateways having the encrypting function to configure the virtual network for each user,
an IP address of the edge node is used as the first virtual network identifier of the user service information, and
the IP address of the edge node is included in the identification information on the first virtual network side of the relay information.

5. The network system according to claim 1, wherein
when the service state is being allocated or operating as the determination of the access detector,
the machine allocation manager does not newly allocate the machine, and
the transfer processor transfers the communication packet of the user between the first virtual network and the second virtual network on the basis of the relay information.

6. The network system according to claim 1, wherein
the identification information on the first virtual network side of the relay information includes a port No. and an identifier of the machine allocation device connected with the virtual network, and the identification information on the second virtual network side includes a port No. and an identifier of the machine allocation device connected with the corresponding virtual network.

7. The network system according to claim 1, wherein
the terminal of the user is dispersed into a first functional terminal having a control function including transmission of the start packet, and a second functional terminal having a delivery function including reception of the service of the application, and the first functional terminal controls the second functional terminal.

8. The network system according to claim 7, wherein
the first functional terminal and the second functional terminal are connected to the different first virtual networks.

9. The network system according to claim 1, wherein
the transfer processor is provided in a router device having a plurality of network communication ports,
the access detector is provided in an add-on module installable in the router device,
the machine allocation manager is provided in a machine management system including a software that manages the machine,
the network manager is provided in a network management system including a software that manages the second virtual network, and
the route device, the machine management system, and the network management system each have a control interface that communicates information for allocating the machines.

10. The network system according to claim 1, wherein
the transfer processor is provided in a router device having a plurality of network communication ports,
the access detector is provided in a control node that is a dedicated device on which the machine or a network processor is mounted,
the machine allocation manager is provided in a machine management system including a software that manages the machine,
the network manager is provided in a network management system including a software that manages the second virtual network, and
the route device, the control node, the machine management system, and the network management system each have a control interface that communicates information for allocating the machines.

11. The network system according to claim 1, wherein
when the user stops the use of the terminal in use,
the machine allocation manager has a function of detecting that the user stops the use of the terminal, and a function of stopping the application that has been used by the terminal, the transfer processor has a function of stopping the relay of the communication packet of the user between the first virtual network and the second virtual network, and the network manager has a function of deleting the user virtual network on the second virtual network between the machine on which the application operates and the machine allocation device.

12. The network system according to claim 1, wherein the first virtual network is any one of Virtual Local Area Network of IEEE802.1Q, Provider Bridging, Provider Backbone Bridging, virtual private LAN service, Multi Protocol Label Switching-Transport Profile, Layer 2 Tunneling Protocol, and Security Architecture for Internet Protocol.

13. The network system according to claim 1, wherein the second virtual network is any one of Virtual Local Area Network of IEEE802.1Q, Provider Bridging, Provider Backbone Bridging, virtual private LAN service, Multi Protocol Label Switching-Transport Profile, Layer 2 Tunneling Protocol, and Security Architecture for Internet Protocol.

14. The network system according to claim 1, wherein the machine allocation manager determines the machine on which the application operates from the plurality of machines on the basis of at least any one information of CPU load information on the machine, power consumption information on the machine, network use bandwidth information on the second virtual network, network priority information on the second virtual network, and history information such as a CPU load or a use period when using the application for each user.

15. The network system according to claim 1, wherein the application is operated on the virtual machine that operates on the machine, or the application is operated as a process on an operating system that is operated on the machine.

16. The network system according to claim 1, wherein the type of the start packet determined by the access detector includes at least one of Universal Plug and Play, Dynamic Host Configuration Protocol, a magic packet, Jini, Bonjour, and a unique protocol specific to the service.

17. A machine allocation device that is connected to a first virtual network and a second virtual network in a network system having the first virtual network configuring a virtual network for each user which is connected to a terminal of the user, a plurality of machines on which applications to be used from the terminal by the user operate, and the second virtual network configuring a virtual network for each user which is connected to the plurality of machines, the machine allocation device includes:

a transfer processor that relays communication packets of the user between the first virtual network and the second virtual network;

an access detector that detects an access from the user;

a machine allocation manager that determines any one of the plurality of machines;

a network manager that manages the network;

a user service information storage unit that stores user service information including a service state indicative of an operating state of each application and a second virtual network identification information indicative of an identifier of each user over the second virtual network, in correspondence with a preset first virtual network identifier indicative of the identifier of the user over the first virtual network, a preset service identifier for identifying each application providing a service to the user, and a preset service type indicative of each allocatable application;

a machine allocation information storage unit that stores machine allocation information including a virtual machine identifier for identifying a virtual machine on which the application operates and a service identifier for identifying the application that operates on the virtual machine, in correspondence with a preset machine identifier;

a relay information storage unit that stores relay information including an identification information on a second virtual network side, in correspondence with an identification information on a first virtual network side; and a second virtual network information storage unit that stores the second virtual network identification information configuring a user virtual network over the second virtual network between the machine and the machine allocation device, wherein the transfer processor detects a communication packet transmitted from the terminal and received through the first virtual network, the access detector detects a start packet to be sent when starting the terminal from the received communication packet, determines the first virtual network identifier and the service type indicative of the application to be used by the terminal according to information on the communication packet and the start packet, and obtains the service state on the basis of the first virtual network identifier and the service type with reference to the user service information, when the service state is non-allocated or stopping, the machine allocation manager determines the machine on which the determined application operates according to a predetermined procedure, and specifies the virtual machine on the determined machine, the network manager obtains non-allocated virtual network identification information in one or a plurality of entries indicative of a connection between the determined machine and the machine allocation device, with reference to the second virtual network information, the network manager adds the virtual network identification information to the one or the plurality of entries of the second virtual network information or another entry of the second virtual network information, and updates the virtual network identification information to configure the user virtual network on the second virtual network, the machine allocation manager starts the specified virtual machine on the machine, and operates the application, the machine allocation manager sets the virtual network identification information to the identification information on the second virtual network side corresponding to the first virtual network identifier with respect to the relay information and, for an entry corresponding to the first virtual network identifier and the service type with respect to the user service information, sets the service state to be allocated or to be operating and sets the virtual network identification information to the second network identifier, and sets the virtual machine identifier of the started virtual machine and the service identifier with respect to the machine allocation information, and the transfer processor transfers the communication packet of the user between the first virtual network and the second virtual network on the basis of the relay information.

18. A machine allocation method for a machine allocation device that is connected to a first virtual network and a second virtual network in a network system having the first virtual network configuring a virtual network for each user which is connected to a terminal of the user, a plurality of machines on which applications to be used from the terminal by the user operate, and the second virtual network configuring a virtual network for each user which is connected to the plurality of machines, wherein the machine allocation device includes:

a transfer processor that relays communication packets of the user between the first virtual network and the second virtual network;

an access detector that detects an access from the user;

a machine allocation manager that determines any one of the plurality of machines;

a network manager that manages the network;

a user service information storage unit that stores user service information including a service state indicative of an operating state of each application and a second virtual network identification information indicative of an identifier of each user over the second virtual network, in correspondence with a preset first virtual network identifier indicative of the identifier of the user over the first virtual network, a preset service identifier for identifying each application providing a service to the user, and a preset service type indicative of each allocatable application;

a machine allocation information storage unit that stores machine allocation information including a virtual machine identifier for identifying a virtual machine on which the application operates and a service identifier for identifying the application that operates on the virtual machine, in correspondence with a preset machine identifier;

a relay information storage unit that stores relay information including an identification information on a second virtual network side, in correspondence with an identification information on a first virtual network side; and a second virtual network information storage unit that stores the second virtual network identification information configuring a user virtual network over the second virtual network between the machine and the machine allocation device, wherein the transfer processor detects a communication packet transmitted from the terminal and received through the first virtual network, the access detector detects a start packet to be sent when starting the terminal from the received communication packet, determines the first virtual network identifier and the service type indicative of the application to be used by the terminal according to information on the communication packet and the start packet, and obtains the service state on the basis of the first virtual network identifier and the service type with reference to the user service information, when the service state is non-allocated or stopping, the machine allocation manager determines the machine on which the determined application operates according to a predetermined procedure, and specifies the virtual machine on the determined machine, the network manager obtains non-allocated virtual network identification information in one or a plurality of entries indicative of a connection between the determined machine and the machine allocation device, with reference to the second virtual network information, the network manager adds the virtual network identification information to the one or the plurality of entries of the second virtual network information or another entry of the second virtual network information, and updates the virtual network identification information to configure the user virtual network on the second virtual network, the machine allocation manager starts the specified virtual machine on the machine, and operates the application, the machine allocation manager sets the virtual network identification information to the identification information on the second virtual network side corresponding to the first virtual network identifier with respect to the relay information and, for an entry corresponding to the first virtual network identifier and the service type with respect to the user service information, sets the service state to be allocated or to be operating and sets the virtual network identification information to the second network identifier, and sets the virtual machine identifier of the started virtual machine and the service identifier with respect to the machine allocation information, and the transfer processor transfers the communication packet of the user between the first virtual network and the second virtual network on the basis of the relay information.

19. The machine allocation method according to claim 18, wherein the second virtual network information storage unit stores the second virtual network identification information including destination identification information and virtual network identification information set for each port, for each of a plurality of ports provided in one or a plurality of switches configuring the second virtual network, and each of a plurality of ports provided in the machine allocation device, the virtual network identification information is a virtual LAN identifier (VLAN ID), and the network manager adds the virtual network identification information to the one or the plurality of entries of the second virtual network information, and updates the virtual network identification information to configure the user virtual network on the second virtual network.

20. The machine allocation method according to claim 18, wherein the second virtual network information storage unit stores the second virtual network information including a second termination address that terminates a tunnel of an encrypting function on a machine side and/or a security parameter index (SPI), which is the second virtual network identification information, in correspondence with the service identifier, an identifier and a port No. of the machine allocation device, which are configuration information of the machine allocation device, and a first termination address that terminates the tunnel having the encrypting function on a machine allocation device side, a first gateway having the encrypting function is provided in an edge of the second virtual network in the machine allocation device, a second gateway having the encrypting function is provided within the virtual machine of each machine, the tunnel having the encrypting function is configured between the first and second gateways having the encrypting function to configure the virtual network for each user, the virtual network identification information is the second termination address and/or the SPI, and the network manager adds the obtained second termination address and/or the SPI which are the second virtual network identification information, in correspondence with the identifier and the port No. of the machine allocation device, and the first termination address, and updates the second virtual network identification information to configure the user virtual network on the second virtual network.

\* \* \* \* \*